(12) United States Patent
Engrav et al.

(10) Patent No.: US 11,861,139 B1
(45) Date of Patent: Jan. 2, 2024

(54) DEFERRING AND ACCESSING DEFERRED CONTENT FROM MULTIPLE APPLICATIONS

(71) Applicant: Microsoft Technology Licensing, LLC, Redmond, WA (US)

(72) Inventors: Peter Loren Engrav, Seattle, WA (US); Trevor Joel Harris, Seattle, WA (US); Nathaniel Marvin Myhre, Kirkland, WA (US); Vishal Mathur, Seattle, WA (US); Archil Tskhondiya, Bellevue, WA (US); Davis Lindsay Wanless, Ontario (CA); Christopher Bobbi Yanasak, Puyallup, WA (US); Maliha Sanaa Lakhani, Westlake Village, CA (US); Jokko Korhonen, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/978,181

(22) Filed: Oct. 31, 2022

(51) Int. Cl.
*G06F 3/04817* (2022.01)
*G06F 16/904* (2019.01)
*G06F 16/9035* (2019.01)
*G06F 16/907* (2019.01)

(52) U.S. Cl.
CPC ........ *G06F 3/04817* (2013.01); *G06F 16/904* (2019.01); *G06F 16/907* (2019.01); *G06F 16/9035* (2019.01)

(58) Field of Classification Search
CPC .................................................. G06F 3/04817
See application file for complete search history.

(56) References Cited

U.S. PATENT DOCUMENTS

| 9,298,786 | B1* | 3/2016 | Wang | G06F 16/9535 |
| 2011/0202971 | A1* | 8/2011 | Margolin | H04L 67/10 |
| | | | | 709/205 |
| 2013/0297645 | A1* | 11/2013 | Foresti | G06F 16/2455 |
| | | | | 707/769 |
| 2016/0139766 | A1* | 5/2016 | Kim | G06F 3/04842 |
| | | | | 715/802 |
| 2019/0384850 | A1* | 12/2019 | Lo | G06F 16/901 |
| 2022/0206995 | A1* | 6/2022 | Zadina | G06F 3/04812 |

OTHER PUBLICATIONS

Gupta, et al., "Define Message Extension Action Commands", Retrieved from: https://web.archive.org/web/20220702225255/https://docs.microsoft.com/en-us/microsoftteams/platform/messaging-extensions/how-to/action-commands/define-action-command?tabs=AS, Jun. 29, 2022, 13 Pages.

(Continued)

*Primary Examiner* — Roland J Casillas

(57) ABSTRACT

Methods and systems for deferring and resuming content from multiple applications. An application executing a client device may have an open content item, such as a file, document, or message. An input to park or defer the content item may be received. In response to the input, a data container for a parked item for the content item is created in a remote content-deferral platform. Metadata for the content item is retrieved and stored within the data container along with additional data, which may be user curated, to form the parked item. The parked item may then be accessed from multiple different applications via a park pane.

20 Claims, 25 Drawing Sheets

(56) References Cited

OTHER PUBLICATIONS

Gupta, et al., "Define Message Extension Search Commands", Retrieved from: https://web.archive.org/web/20220515105928/https://docs.microsoft.com/en-us/microsoftteams/platform/messaging-extensions/how-to/search-commands/define-search-command, Apr. 29, 2022, 9 Pages.

Kirkham, et al., "Office UI Elements for Office Add-ins", Retrieved from: https://docs.microsoft.com/en-us/office/dev/add-ins/design/interface-elements, May 21, 2022, 2 Pages.

* cited by examiner

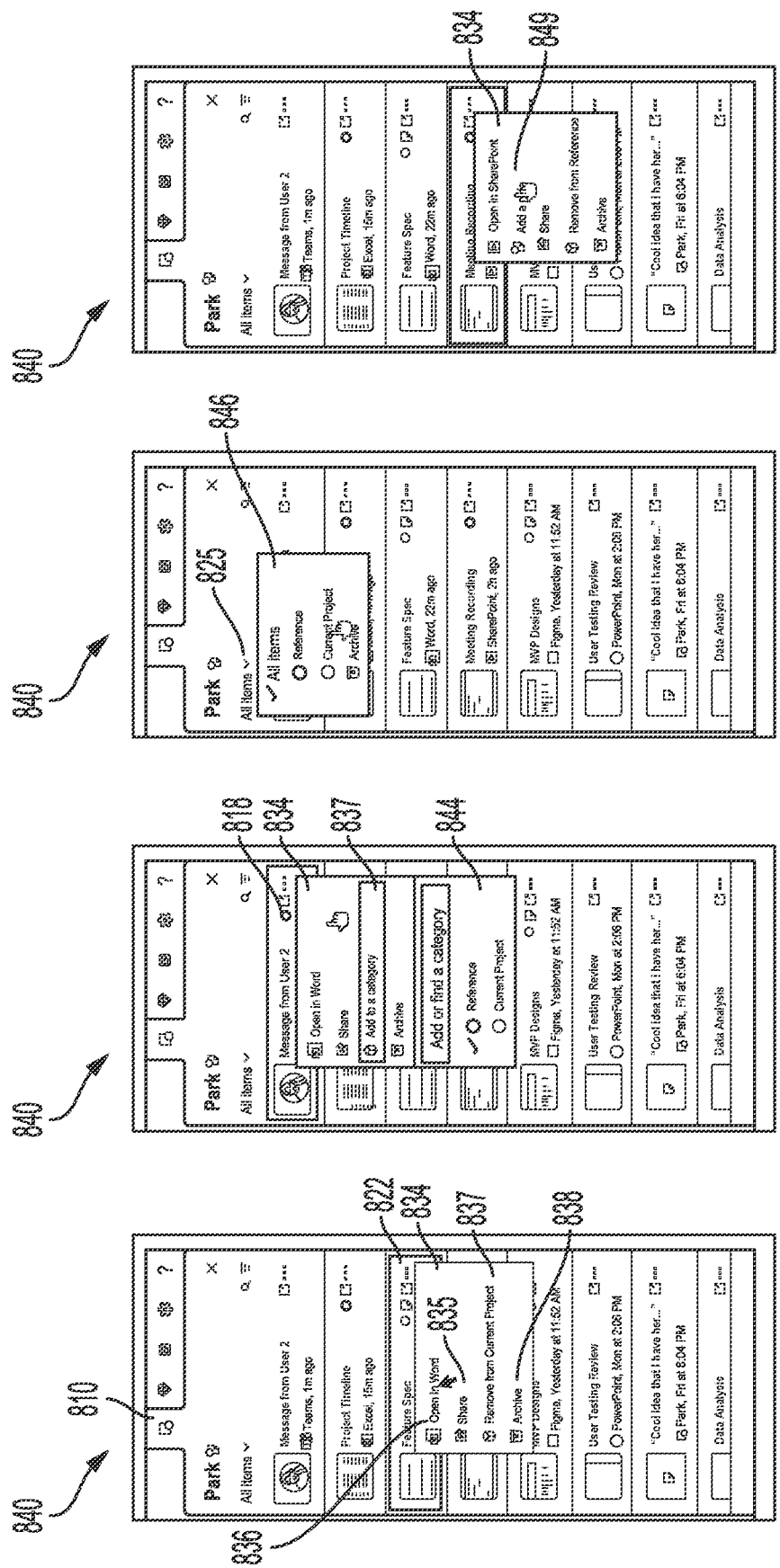

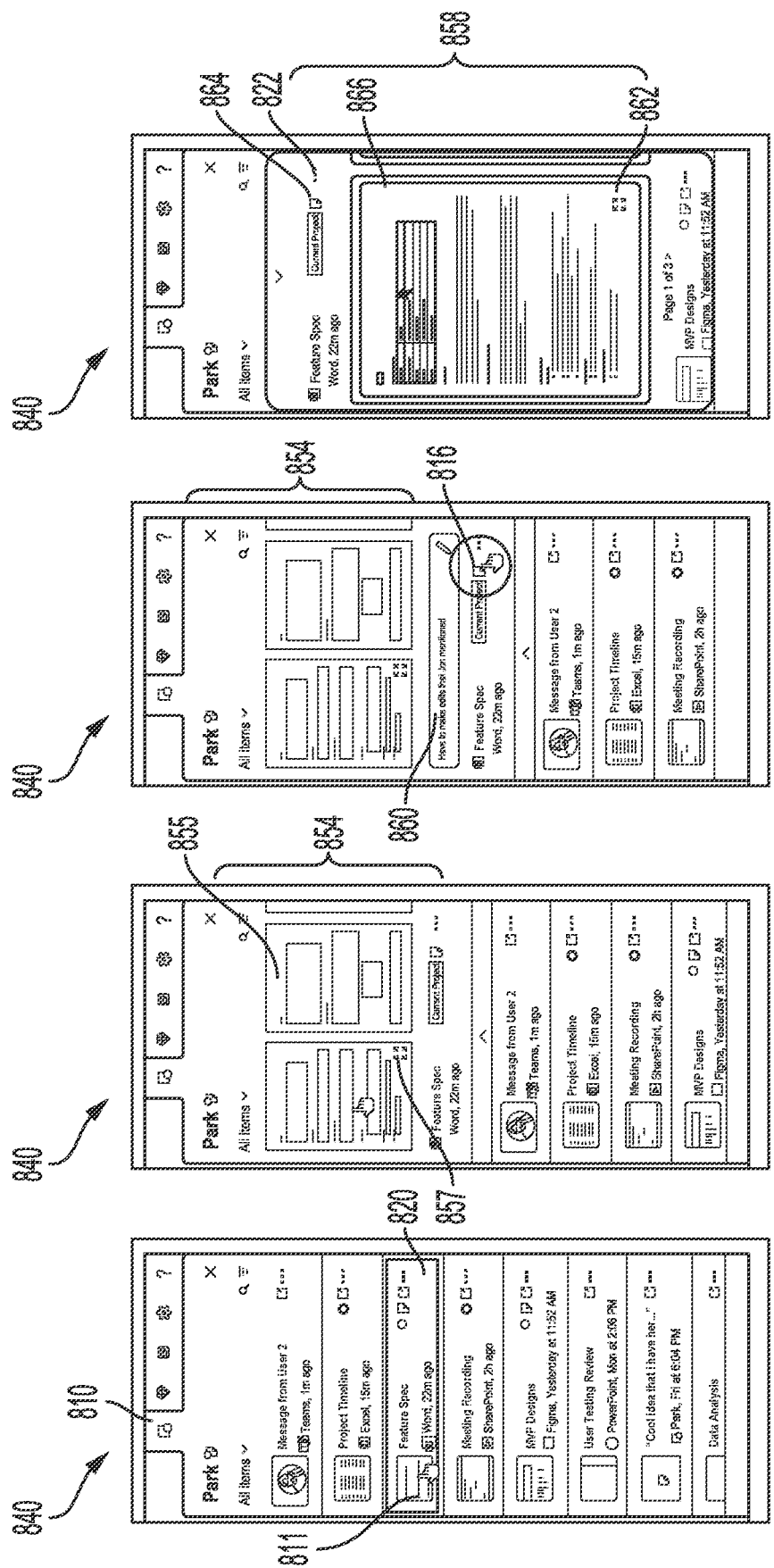

DEFERRING AND ACCESSING DEFERRED CONTENT FROM MULTIPLE APPLICATIONS

BACKGROUND

As computing speeds and capabilities continue to increase and advance, the number of applications and files that may be opened and edited at a single point in time continues to grow. Due to these advancements, multitasking through multiple applications and projects has become common place. However, with the multitasking capabilities, projects and progress may become lost or abandoned due to the large amount of windows, applications, and projects taking place on a client device.

SUMMARY

The presently disclosed technology can intelligently assist users in deferring and getting back to their deferred work. For instance, the disclosed technology includes methods and systems for deferring and resuming content from multiple applications. For instance, a productivity application, executing on a client device, may have open content (e.g. file, document, message, etc.). An input to park or defer the content is then received (e.g., defer the content for later reference), such as from an input element in a ribbon of productivity application. In response to the input, a data container for a parked item for the content is created in a remote content-deferral platform. Metadata for the content is retrieved and stored within the data container along with additional data, which may be user curated, to form the parked item. The parked item may then be accessed from multiple different applications via a park pane that may be a sidebar or pane displayed within the application.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The following drawing figures, which form a part of this application, are illustrative of aspects of systems and methods described below and are not meant to limit the scope of the disclosure in any manner, which scope shall be based on the claims.

FIGS. 8A-8L depict example interfaces of a sidebar or park pane according to various examples of the present technology.

DETAILED DESCRIPTION

Figure 1:
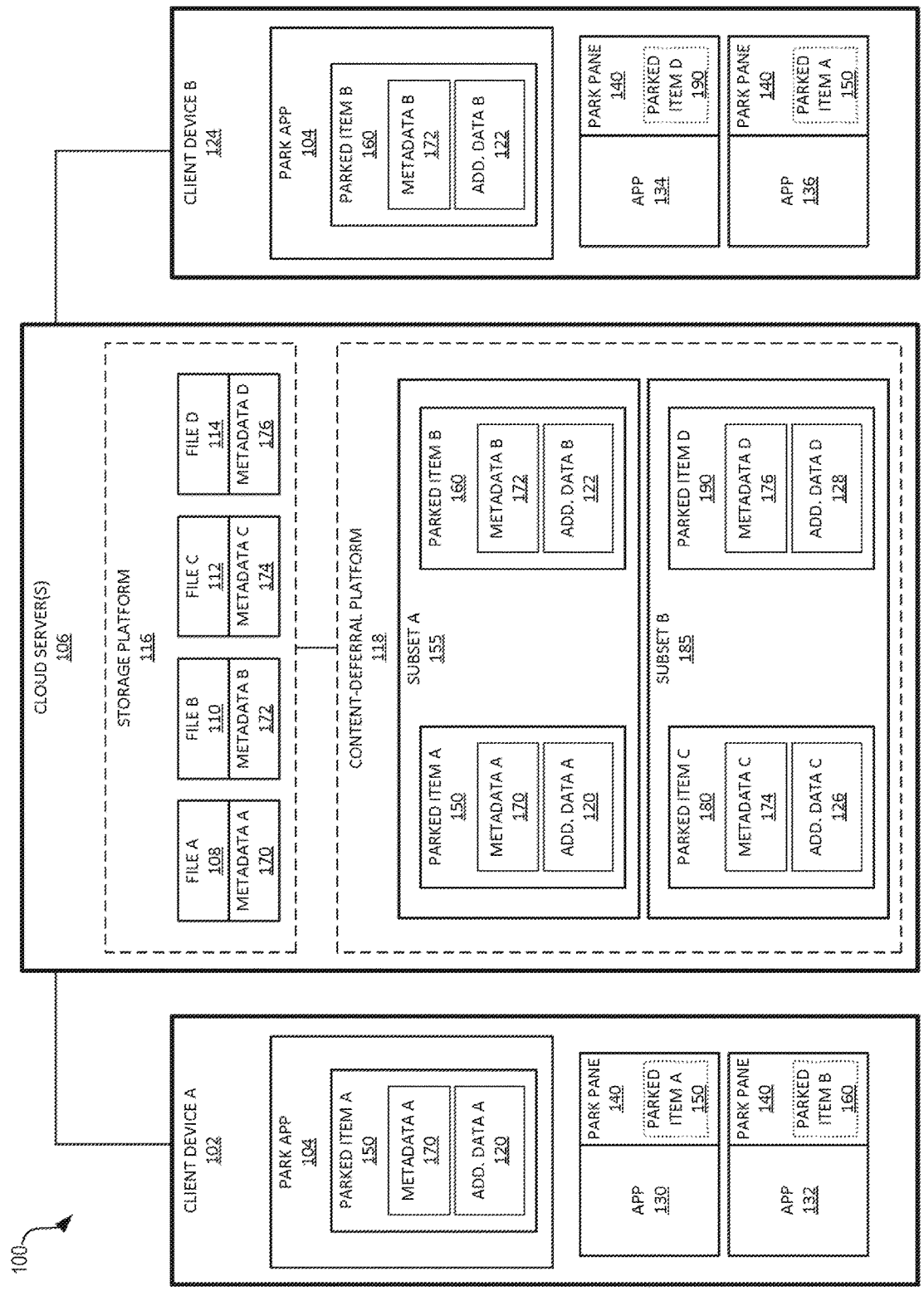
FIG. 1 depicts an example system for a content-deferring application in accordance with various embodiments of the present disclosure.

As briefly discussed above, modern computers provide for the ability to concurrently execute multiple applications and multiple instances of those applications. As a result, multitasking may be commonplace, where switching between files and applications occurs. This multitasking leads to significant difficulties in tracking the applications and files, which often results in work being left behind or abandoned. Recent surveys suggest that over 75% of information workers need to defer in-progress work before it is finished. In such scenarios, when the user returns to the work, queries are generally executed or multiple navigation hops are completed before the files can be identified and reopened. In other examples, multiple applications are left open and running, which taxes the computing resources of the client device and often prevents shut down or restart cycles of the client device. In either case, substantial computing resources are expended to reidentify files that have been left behind before their completion.

The technology disclosed herein relates to computing capabilities that allow for efficient deferral of in-progress work and/or content for later retrieval, while minimizing increases in memory and bandwidth usage. The technology utilizes a content-deferral application (which may also be referred to herein as a "park application"). The content-deferral application enables users to defer, and return to, in-progress work. For instance, the present technology provides an action to defer, or park, and retrieve content (e.g., content items) during the regular flow of work. As used herein, the terms park and defer may be substantially synonymous with one another. The technology also provides a home for the users' heterogenous parked content that is available within other applications such that the parked content may be accessed from a variety of applications. By creating a ubiquitous and contextual mechanism for deferring work, the computing process from beginning to end of a project is more efficient and users can unload the stress of unfinished work, while being able to jump back in when ready—resulting in a more efficient and effective work experience.

In examples, the content-deferral application reduces the computing burden required to create, store, preview, and/or access content or items a user defers or seeks to return to at a later time by leveraging a metadata storage layer and/or meta folders. For instance, at any point in time, a content item may be deferred or parked, forming parked content, directly from the native application in which the content is being edited or accessed. As an example, when a word-processing document is open in a word-processing application, the word-processing document may be parked directly from the word-processing document. A different type of content may be open in a different application, and that content may similarly be parked directly from the different application.

The content-deferral application utilizes a subset of data (e.g., metadata) associated with the parked content to enable identification, quick access to pertinent information, and context-related attributes, so that parked content may be previewed along with context-related attributes without the need to load the parked content itself. The original content item (e.g., file, message) corresponding to the parked item remains stored in its original location (e.g., remote server) and is not duplicated or replicated by the content-deferral application.

FIG. 1 depicts an example system 100 for deferring content in accordance with various embodiments of the present disclosure. The example system 100 includes a plurality of different client devices, such as client device A 102 and client device B 124, in bidirectional communication with one or more cloud servers 106. The client device A 102 and the client device B 124 both are able to access a park application or content-deferral application 104 comprising a defer or park feature that enables each user to defer or park content and resume this parked content via the context of the parked content. The content-deferral application 104 may be a web-based application, native application, and/or hybrid application. For instance, when in the form of a web application, the content-deferral application 104 may be accessed via a web browser or through a pane of another application. The content-deferral application 104 may also be a local or native application on the content-deferral application 104.

The content-deferral application 104 may be accessed as a standalone application (e.g., shown as content-deferral application 104) and/or as an integrated user interface (e.g., park pane 140) that can be accessed from various other compatible applications (e.g., applications 130, 132, 134, and 136). For example, the functionality of the content-deferral application 104 may be accessed through a sidebar or pane, referred to as a park pane 140, of various applications, such as email applications, word-processing applications, collaboration applications, messaging applications, spreadsheet applications, presentation applications, etc.). Both user interfaces of the content-deferral application 104 provide the capabilities to defer content items and to access parked items.

Parked content items may be associated with a particular user and accessed by the user across different devices, such as client device A 102 and client device B 124. To provide such functionality, the content-deferral application 104 may require a user login or similar identity authentication, so that an individual may login and use the content-deferral application 104 on any device on which the content-deferral application 104 is configured to operate. This functionality may be enabled by a park app platform 118, which stores parked items on a remote server 106 and can be accessed by various client devices of the respective user. As such, the client device A 102 and client device B 124 may be any of a desktop or laptop computer, a mobile device, such as a mobile phone or tablet, or any similar device on which the content-deferral application 104 is capable of operating. As an example, the user of client device A 102 may park an item using a laptop computer, modify the parked item using a tablet, and access the modified parked item on a mobile phone. Similarly, this user may park an item using the standalone user interface of the content-deferral application 104, park another item using the integrated park pane 140 of application 130, and access either of these parked items using the park pane 140 of application 132. The user of client device B 124 may have the same flexibility in creating parked items, modifying parked items, and accessing parked items via various client devices and user interfaces of the content-deferral application 104.

One or more parked items 150, 160, 180, and 190 may be generated via the standalone user interface of the content-deferral application 104 and/or the integrated user interface in a park pane 140. In the example depicted, upon the content-deferral application 104 being activated through either the standalone content-deferral application 104 or the park pane 140, the content-deferral application 104 may create a new parked item container, such as parked item A 150.

As one example of generating a parked item, such as parked item A 150, a first file A 108 may be opened within a first application 130. The file A 108 may be a word-processing document, and the first application 103 is a word-processing application that can be used to edit the file A 108. The file A 108 is stored in a storage platform 116 on the one or more remote servers 106. The storage platform 116 may also store many additional files, such as file B 110, file C 112, and file D 114. When file A 108 is opened within the first application 130, file A 108 is accessed from the storage platform 116. Each of the files stored in the storage platform 116 may also have associated metadata that is accessible separately from the respective file. For instance, file A 108 has metadata A 170, file B 110 has metadata B 172, file C 112 has metadata C 174, and file D 114 has metadata D 176. While files are shown in example system 100, content items other than files, along with corresponding metadata, may be stored in the content platform 116.

With the first file A 108 opened in the first application 130, a selection within the application to defer or park the first file A 108 is received. Such a selection may be of a user interface element, such as a button or graphical element within a ribbon of the first application 130. In response to receiving the selection to park the first file A 108, the parked item A 150 is created by the content-deferral application 104.

To create the parked item A 150, a new data structure or container is created for the new parked item. The new data structure may be generated in a content-deferral platform 118 that is stored on one or more the remote servers 106. The data structure or data container includes defined fields for the metadata of the corresponding file and the additional data, which may be created or edited by a user. For instance, metadata fields that are supported by the content-deferral application 104 and/or the content deferral platform 118 are generated in the data structure. For example, defined fields for the link or pointer to the content item along with fields for the metadata types discussed herein may be generated as part of the data container. Similarly, defined fields for the additional data supported by the content-deferral application 104 and/or the content-deferral platform 118 may be generated in the container. The defined metadata fields and/or additional data fields may then be filled with received metadata or received additional data.

The content-deferral application 104 may then request metadata A 170 for file A 108 from the storage platform 116. Or, if the metadata A 170 is already loaded by the first application 130, the first application 130 may transfer the metadata A 170 to the content-deferral application 104. Once the metadata A 170 is received by the content-deferral application 104, the metadata A 170 is incorporated into the data container of the new parked item container for parked item A 150. The actual contents of file A 108, however, is not stored in the parked item A 150 or the park app platform 118. Accordingly, no duplicate files need be created, and the parked item A 150 may operate with the metadata A 170, which requires significantly less storage space than the file A.

In some examples, updates to the metadata of the files stored in the storage platform 116 may be pushed to the metadata in the corresponding parked items such that the metadata in the parked items remains updated. In other examples, when a parked item is accessed, the metadata may be updated from the storage platform 116 upon access or retrieval of the parked item.

In some examples, additional data A 120 may also be stored in the new parked item A 150. The additional data A 120 may include data that is specified or editing by the user through the content-deferral application 104. For example, the additional data A 120 may include notes for the parked item A 150, a category for the parked item A 150, ordering information, and/or other additional data that is not otherwise stored as part of the file A 108 or the metadata A 170. The additional data A 120 may also include a date stamp as to when the parked item A 150 was created and/or last edited or accessed.

Once the new parked item A 150 is created, the parked item A 150 from the park app platform 118 via any of the authenticated client devices. For example, client device A 102 and/or client device B 124 may access the parked item A 150. The parked item A 150 may also be accessed via the different interfaces of the content-deferral application 104, such as through the standalone application or through a park pane 140 of another application (e.g., one of applications 130, 132, 134, 136). For instance, when accessing the content-deferral application 104, the content-deferral application 104 requests the parked items, from the park app platform 118, associated with the current user. Those parked items are then received at the respective client device and displayed. Because the parked items do not include the entire file to which the parked item corresponds, transmission of the parked items also requires significantly less bandwidth than transmission of the actual file. In some examples, when a new parked item is created, the parked item may be initially generated at the client device and then transmitted to the park app platform 118 for storage.

For displaying and/or accessing a parked item, content-deferral application 104 receives a request to view a parked item which can be opening the standalone content-deferral application 104 or opening a park pane 140 within another application. This request causes the content-deferral application 104 to retrieve the stored parked items for that user in the park app platform 118 of the cloud server(s) 106. The cloud server(s) 106 then sends the parked items to the respective client device(s).

The parked items are displayed based on the user interface of the content-deferral application 104 that received a request to view the parked item. For example, the parked items may be displayed in a park pane 140 view within another application and/or within the standalone content-deferral application 104. Furthermore, upon display of parked items in various user interfaces, the parked items may be opened or modified based on user inputs and interactions with the parked items. For instance, a user interface element within the displayed parked item may cause the file corresponding to the parked item to be opened. Triggering the file associated with the parked item to be reopened causes the application associated with the launch and open the file. For example, if the parked item A 150 is selected to open the word-processing document of file A 108, the word-processing application 130 may be launched and the file A 108 may be opened by the word-processing application 130. In other examples, the corresponding file (e.g., file A 150), may be opened within the park pane 140 or a secondary pane of a standalone content-deferral application 104 by launching a web-based version of the application corresponding to the file within the park pane 140 (e.g., a web-based word-processing application).

When multiple parked items are created, the parked items may be stored as different subsets according to categories or tags of the parked items. In the example depicted, parked item A 150 (corresponding to file A 108), parked item B 160 (corresponding to file B 110), parked item C 180 (corresponding to file C 112), and parked item D (corresponding to file D 114). Parked item A 150 and parked item B 160 may have the same categorization or tag and are thus related together as subset A 155 of the parked items. Similarly, parked item C 108 (with metadata C 174 and additional data C 126) and parked item D 190 (with metadata D 176 and additional data D 128) may share a common categorization or tag and are thus related together as subset B 185 of parked items. The categorization or tag that results in the groupings of parked items may be stored in the respective additional data of the parked items and is editable by a user. Accordingly, the user may add or change the categorization of the parked items through the content-deferral application 104, either in the standalone form or as a park pane 140.

Categories can include current project, reference, personal, or any other general categorization associated with the content of the parked item. The categories may be set manually or automatically via the content-deferral application 104. For instance, based on the parked items may be automatically categorized based on the extracted metadata associated with that parked item. For example, the metadata for a file associated with a parked item may include particular tags (such as a project name) that may be automatically copied into the additional data of a parked item and used for categorization. Other automatic categorization may result from analyzing the content of the file or other content item to extract or generate one or more categories for the parked item. For instance, keywords or other concepts within the file or other content item may be determined and used to automatically tag a category for the parked item.

As briefly discussed above, the metadata for the parked items may be extracted from a meta storage layer or store of the storage platform 116. The metadata provides identifying data about the corresponding content item or file that can used to create a display of the parked item that informs the user about the file. For instance, the metadata may include data such as file title, file type, a preview of the file, author, created time, last modified time, tags, status, subject, related people, etc. The parked item may also include a link or pointer to the associated file, and such a link or pointer may be included in the metadata. The content-deferral application 104 may display the metadata within the respective parked items in various manners as discussed below.

When parked items are accessed within a park pane 140 of an application, parked items may be organized or sorted based on context of parked items, which may be based on the metadata and/or additional data of the respective parked item. As an example, the parked items may be sorted or filtered based on the type of application in which the park pane 140 is activated. For instance, if the park pane 140 is activated in a word-processing application, parked items corresponding to word-processing documents may be displayed first. As another example, if the park pane 140 is activated in an email application, parked items corresponding to emails may be displayed first. The sorting or filtering of the parked items within a park pane 140 may also be based on tags or metadata of a document that is currently open in the application. For instance, if a word-processing application has a document open for editing, and the document has a "Project A" tag, the parked items that similarly have a "Project A" tag may be displayed first.

Figure 2:
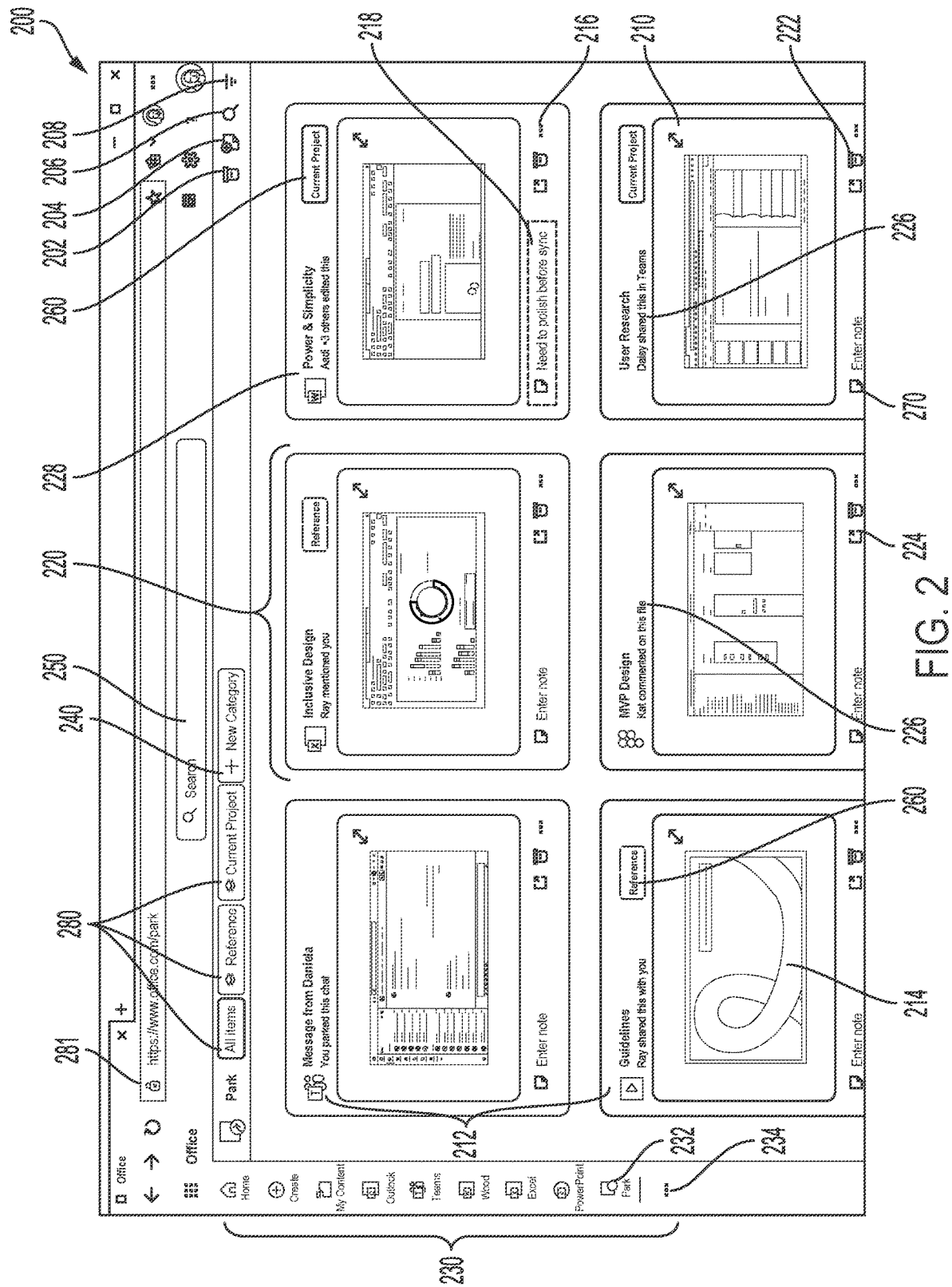
FIG. 2 depicts an example home interface for the content-deferral application in accordance with various embodiments of the present disclosure

FIG. 2 depicts an example home interface 200 for the content-deferral application 104 in accordance with various embodiments of the present disclosure. In this example, the content-deferral application 104 is a web-based application and accessed via a web browser through a web address entered into a navigation bar 281. However, in other embodiments, the content-deferral application 104 may be a native application or hybrid application. The home interface 200 serves as a hub for parked items and generates a preview, "card", or representation 220 for each parked item. Each parked item preview or representation 220 displays various levels of information, such as the metadata as well as the additional data associated with each parked item. The home interface 200 may provide general functionalities directed to all or a subset of parked items as well as specific functionalities associated with each parked item representation 220.

The home interface 200 of the content-deferral application 104 may include a list 230 of web-based application icons and an indicator 232 of the current app being accessed. A selectable expansion user interface element 234 may also be provided to display additional web-based applications that are available for selection.

The home interface 200 may provide top-level functionalities for interacting with the parked items. For instance, a selectable archive icon 202 may be included for archiving a selected parked item. A selectable note icon 204 may be included for generated and parking a note (e.g., created a new parked item for a newly created note). A search bar 250 may also be included to allow for searching for all content items (e.g., files) and parked items. A search icon 206 may be provided for searching just parked items provided within the web-based park application. For instance, upon selection of the search icon 206, a search field may be presented where query terms may be entered and executed against the available parked items for the user accessing the content-deferral application 104. A filter icon 208 for filtering park items may also be displayed. When the filter icon 208 is selected, a set of filter criteria may be displayed. The filter criteria may be based on fields of the metadata and/or additional information of the available parked items.

Category filter options 280 may also be separately displayed. Each of the category filter options correspond to one or more categories of the parked items. For example, the category filter option is "All items," and when the "All items" element is selected, all the park items are displayed (e.g., the parked items are not filtered by category). A second category filter option, associated with a second category ("Reference"), and a third category filter option, associated with a third category ("Current Project") may also be displayed. When one of those category filter options is selected, the displayed parked items are filtered based on the corresponding category. A new category option 240 may also be displayed for creating a new category.

Each of the parked item representations 220 may also include interactive and/or informative features. For instance, the parked item representation 220 may include the title 228 of the file corresponding to the parked item. A content preview 214 may also be included in the parked item representation. The content preview 214 provides a preview or an image of content of the file associated with the parked item. The image of content of the file may be stored as part of the metadata for the file.

The parked item representation 220 may include content type indicator 212 that indicates a type of file for which the parked item corresponds. The content type indicator 212 may be an icon of an application for which the file of the parked item corresponds and/or the application that would be used to open the corresponding file. For instance, the content type indicator 212 may be an icon of a word-processing application where the file of the parked item is a word-processing document. A recent activity indicator 226 may also be provided that indicates recent activity relating to the parked item and/or the file corresponding to the parked item. For example, the recent activity indicator 226 may indicate that the user ("you") parked the file as the most recent activity. In other examples, the recent comments and/or share activity of the file may be reflected in the recent activity indicator 226.

A category label 260 may also be provided in the parked item representation 220. The category label 260 indicates the category 260, which may be stored as additional data of the parked item. The category label 260 may be selectable, and selection of the category label 260 provides an interface for changing the category of the parked item.

The parked item representation 220 also includes action icons for actions that may be performed on the parked item representation 220 and/or the parked item. For instance, the parked item representation 220 may include an archive icon 222 that, when selected, causes the parked item to be archived (e.g., deleted from the content-deferral platform). The parked item representation 220 may also include a launch icon 224 that, when selected, causes the file associated with the parked item to be launched in its corresponding application (e.g., a word-processing application where the file is a word-processing document).

A note generation icon 270 may also be included that, when selected, provides an interface for adding or editing a note associated with the parked item. When the note is added, the note may be stored as additional data of the parked item (rather than metadata of the file). Also once a note is added, or if a note has been previously associated with a parked item, the parked item representation 220 includes a display or portion of the content of the note in a note indicator 218. An additional-functions indicator 216 may also be provided in the parked item representation 220. When the additional-functions indicator 216 is selected, additional functions for interacting with the parked item may be displayed, such as an option to share the parked item.

In some examples, an expansion icon 210 may also be displayed. When the expansion icon 210 is selected, the parked item representation 220 is expanded to show more information about the parked item, as shown in FIG. 3 and discussed below.

Figure 3:
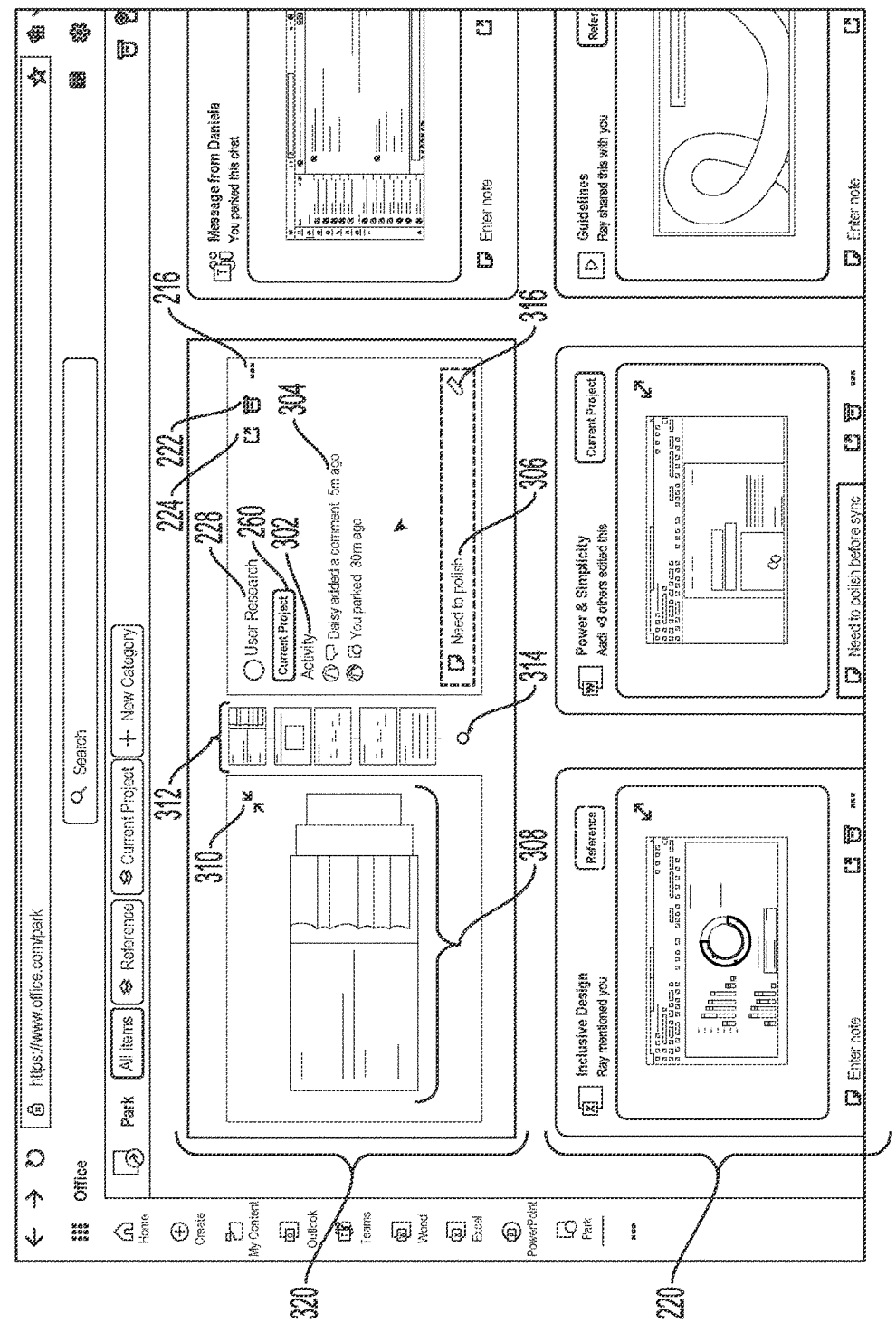
FIG. 3 depicts another example home interface for the content-deferral application after an expansion icon of a parked item representation has been selected.

FIG. 3 depicts another example home interface 300 for the content-deferral application 104 after an expansion icon 210 of a parked item representation 220 has been selected. More specifically, FIG. 3 depicts an example interface that may be generated by the content-deferral application 104 upon a user activating the expand button 210 in the parked item representation 220 titled "User Research" in FIG. 2. In this example, an expanded or detailed parked item preview 320 is displayed following expansion of the parked item representation 220.

Expanding the parked item representation 220 to form the detailed parked item preview 320 allows for more information to be displayed about the parked item and/or the corresponding file. For instance, expanded preview images 308 and additional page previews 312 of the file may be displayed in the detailed parked item preview 320. The additional page previews 312 may be selected for enlargement and a search option 314 for searching the file may also be provided. Additional activity data 302 regarding activity on the file may also be displayed along with timestamps 304 of the activity. An expanded notes indicator 306 and a note editing icon 316 may also be displayed for editing the note. The expansion icon 210 may also change to a contraction icon 310 that, when selected, causes the detailed parked item preview 320 to become the parked item representation 220 again.

FIGS. 4-8 illustrate various integrations of the content-deferral application 104 into other applications, such as file or content-item viewing applications, productivity applications (e.g., word-processing applications, spreadsheet applications, etc.), video applications, communication applications, among others. FIGS. 4A-C depict an example interface 400 of a file-accessing application 404 that allows multiple types of files to be identified and accessed.

Figure 4A:
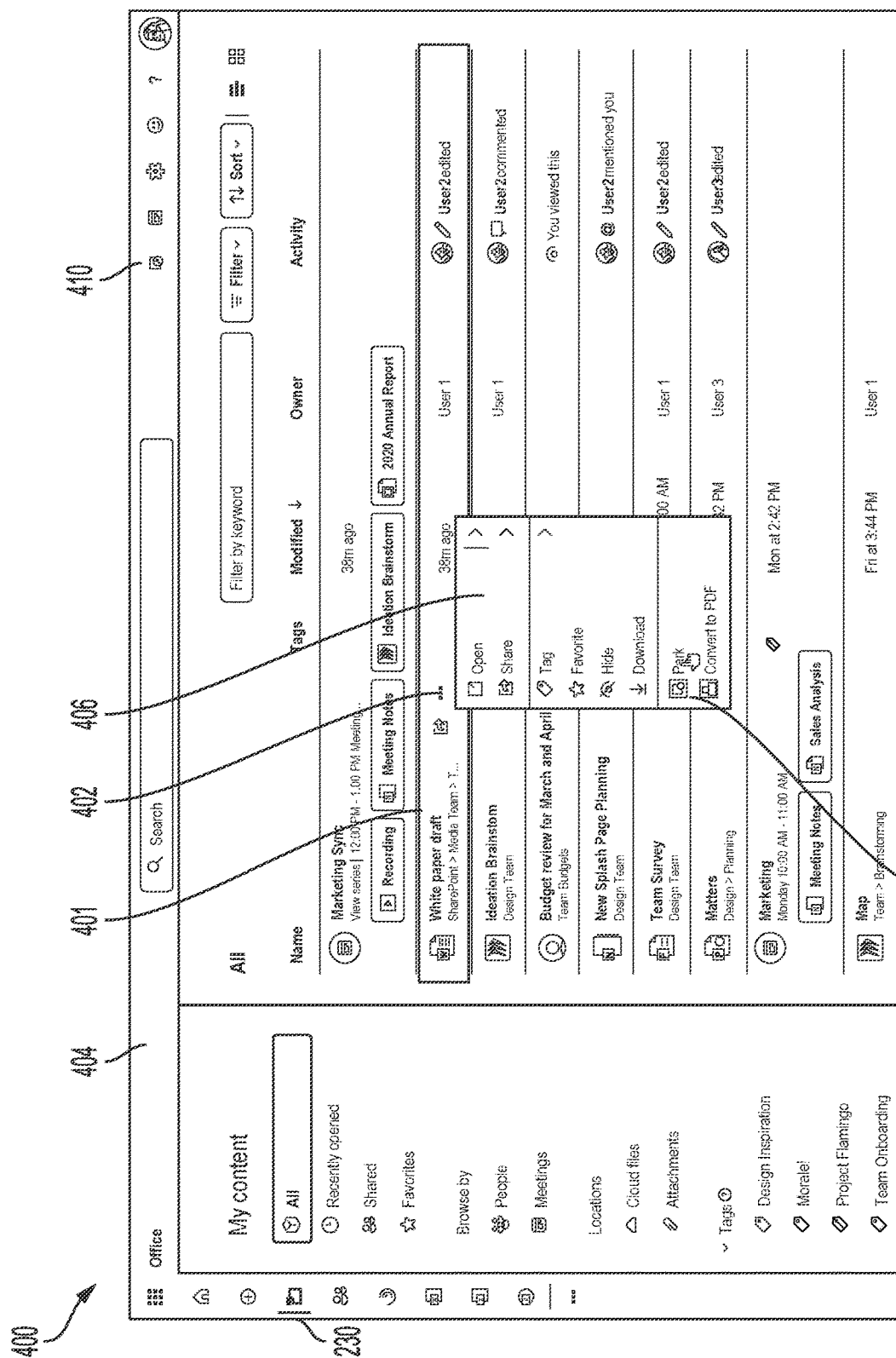
FIGS. 4A-C depict an example interface of a file-accessing application that allows multiple types of files to be identified and accessed.

In FIG. 4A, the file-accessing application 404 lists a plurality of different content item or file representations 401. Each of the file representations 401 may include an additional-functions option 402 (e.g., an ellipsis icon) that, when selected, provides an action menu 406 of additional options for interacting with the corresponding file, such as opening the file or sharing the file. The action menu 406 also includes a defer or park option 408. The park option 408, when selected, causes a parked item to be created for the file or content item. While the park option 408 is depicted as being provided in an activation menu 406 that is activated upon selection of an additional-functions option 402, in other examples, the park option 408 may be presented in different manners. For instance, the park option 408 may be displayed in a context menu that is activated based on a hover, long-press, and/or right-click of the content-item or file representation. In other examples, the park option 408 may be displayed within the file representation. In still other examples, the park option 408 may be displayed as a more permanent icon within the interface of the file-accessing application, such as part of the ribbon. In such examples, a particular file representation 401 may first be selected, and the park option may be subsequently selected to cause the creation of parked item for the file of the file representation 401. The interface 400 of the file-accessing application 404 may also include a park-pane activation icon 410 that, when selected, causes a park pane to be displayed, as discussed further below.

Figure 4B:
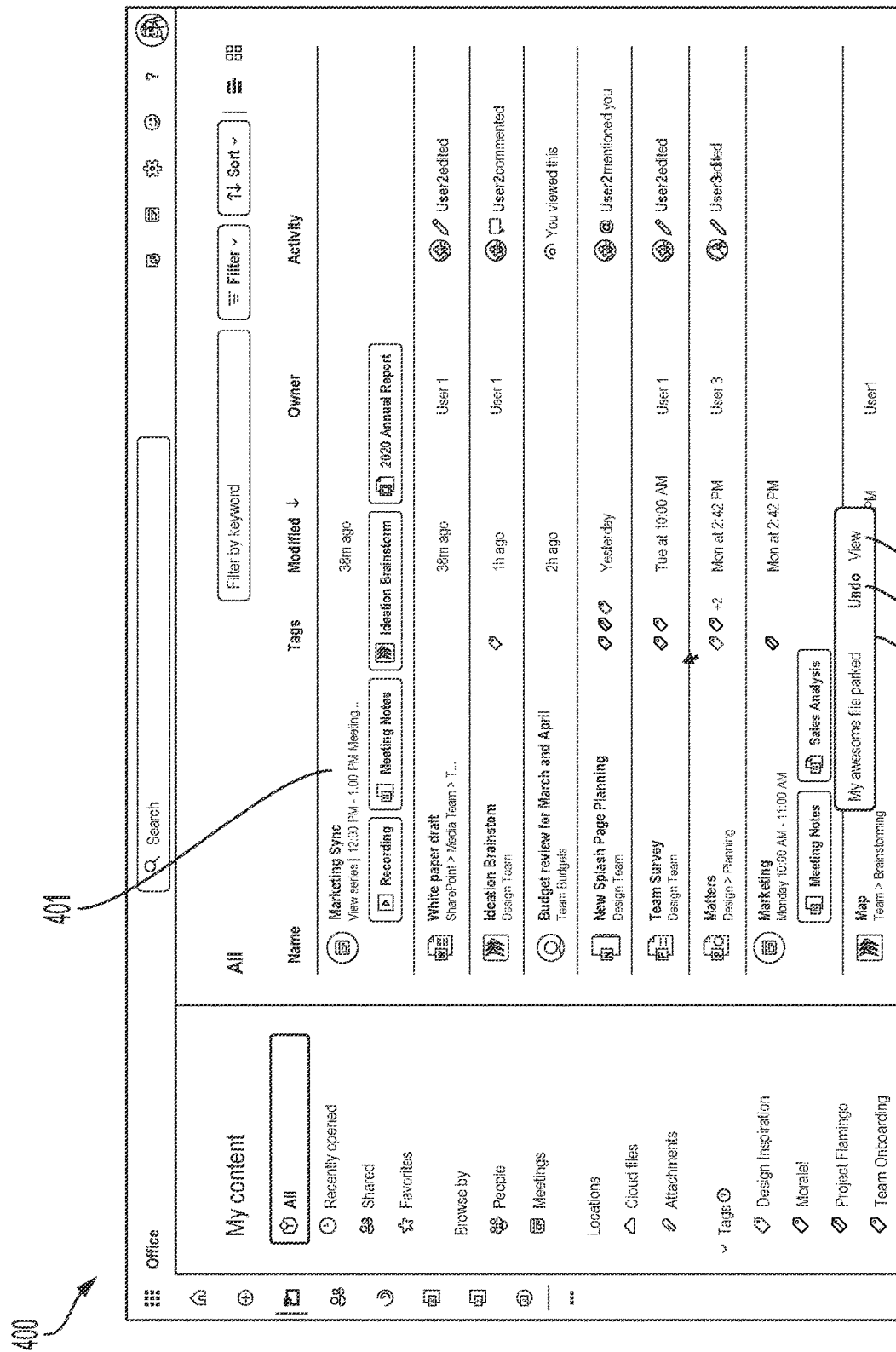

As shown in FIG. 4B, once the park option 408 has been selected, a park notification 412 may be displayed indicating that the parked item has been created. The notification 412 may include the title of the file to convey to the user which file has been parked. The notification 412 may also include an undo option 413 that causes the created parked item to be deleted. The notification 412 may also include a view option 415 that, when selected, causes the created parked item to be displayed. Displaying the parked item may include activating a park pane and/or launching a standalone content-deferral application 104.

Figure 4C:
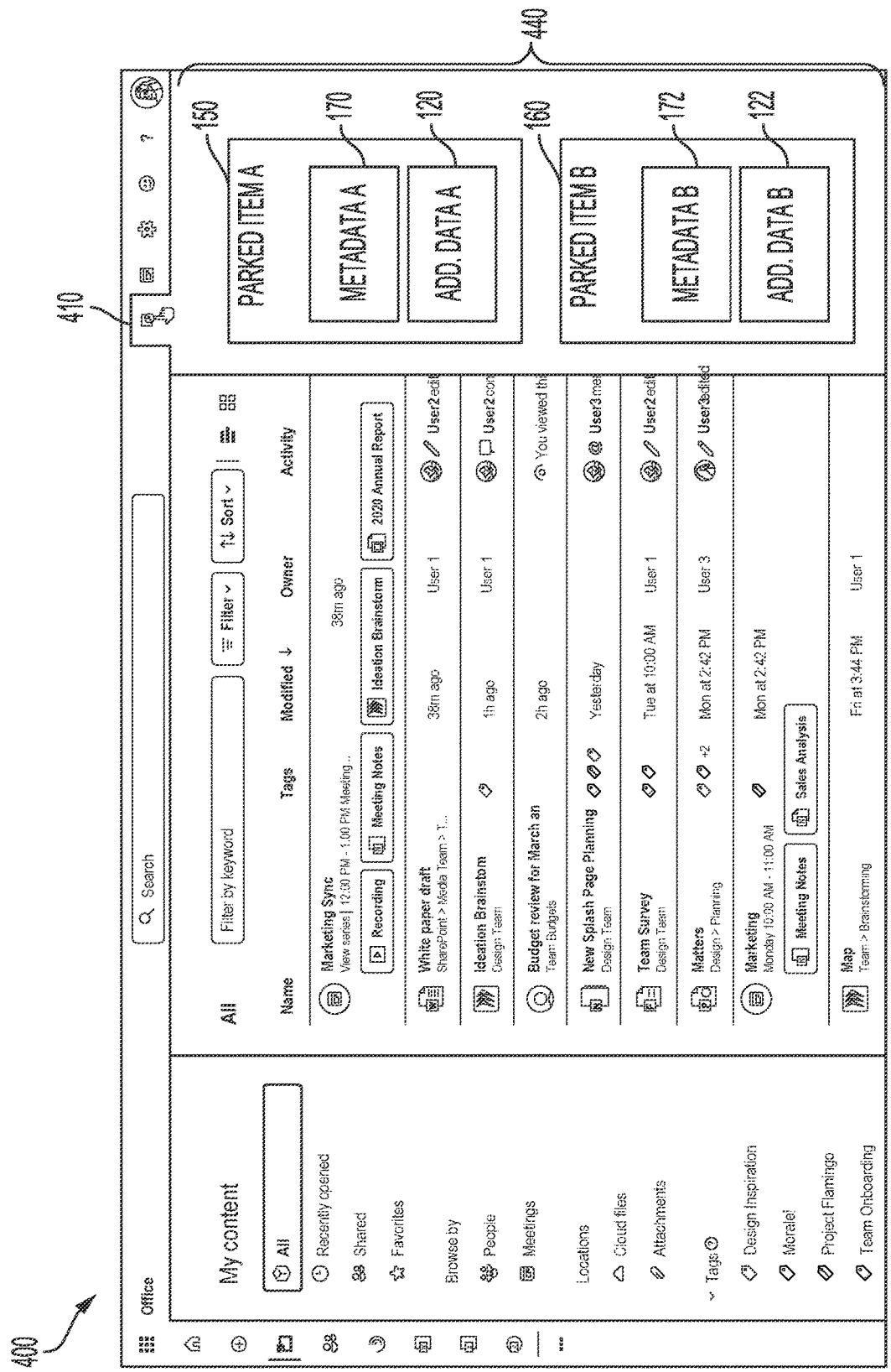

FIG. 4C depicts a park sidebar or park pane 440. As discussed above, the park pane 440 may be accessed by activating a park-pane activation icon 410 in the ribbon of the application 404, or the park pane 440 may be automatically activated upon parking a file. The park pane 440 displays representations of parked items for the user, and the parked items may be represented similarly to the parked item representations 220 discussed above. Accordingly, the park pane 440 may list the parked items for a specific user and include capabilities to add, modify, or categorize the parked items therein. These capabilities are illustrated in FIGS. 8A-8J and further described in the corresponding paragraphs below. In the example depicted, representations for the parked item A 150 and the parked item B 160 may be displayed within the park pane 440. The representations may include information or data based on the metadata A 170, the additional data A 120, the metadata B 172, and/or the additional data B 122.

Figure 5A:
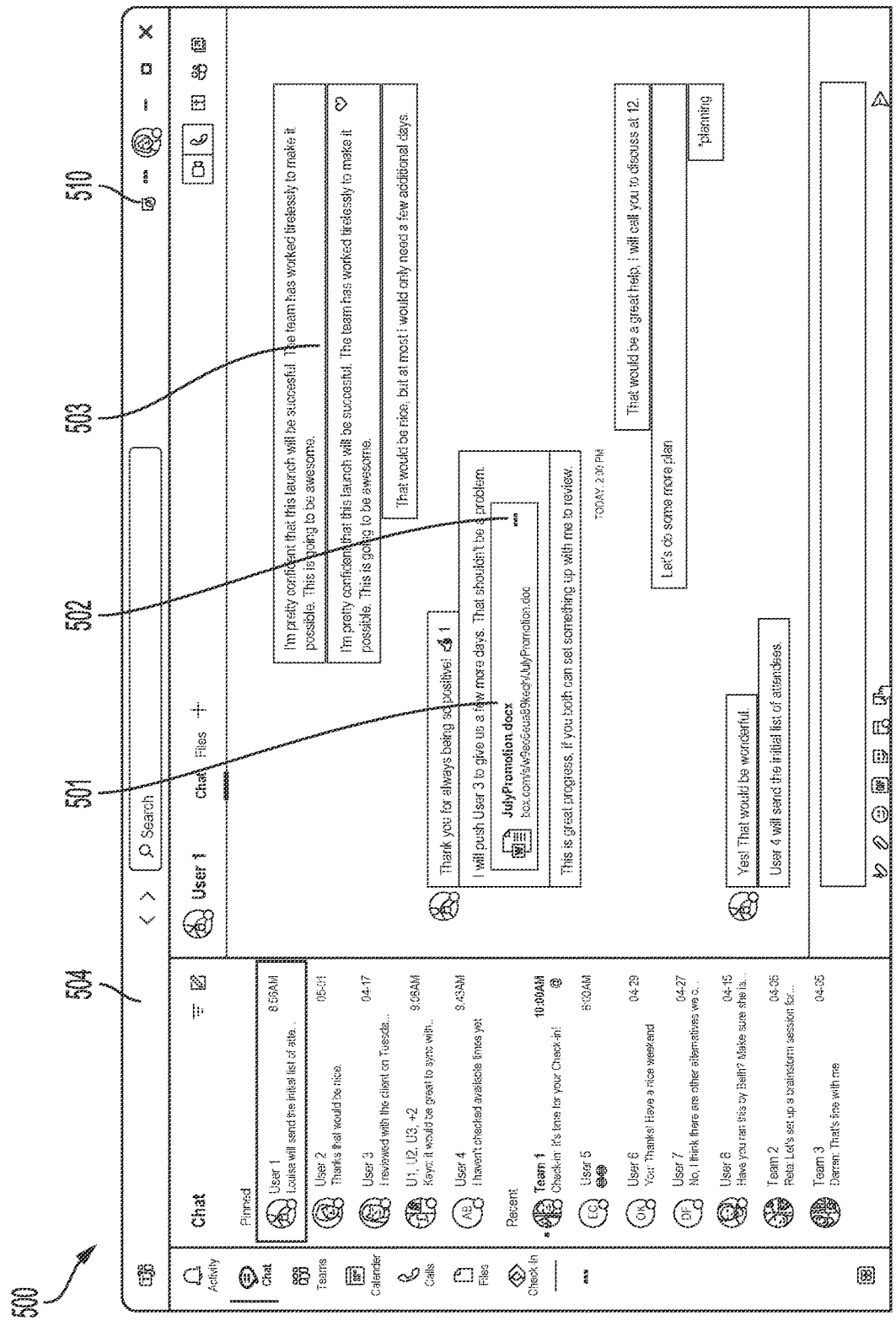
FIGS. 5A-C depict an example interface of a collaboration or messaging application in accordance with various embodiments of the present disclosure.
Figure 5B:
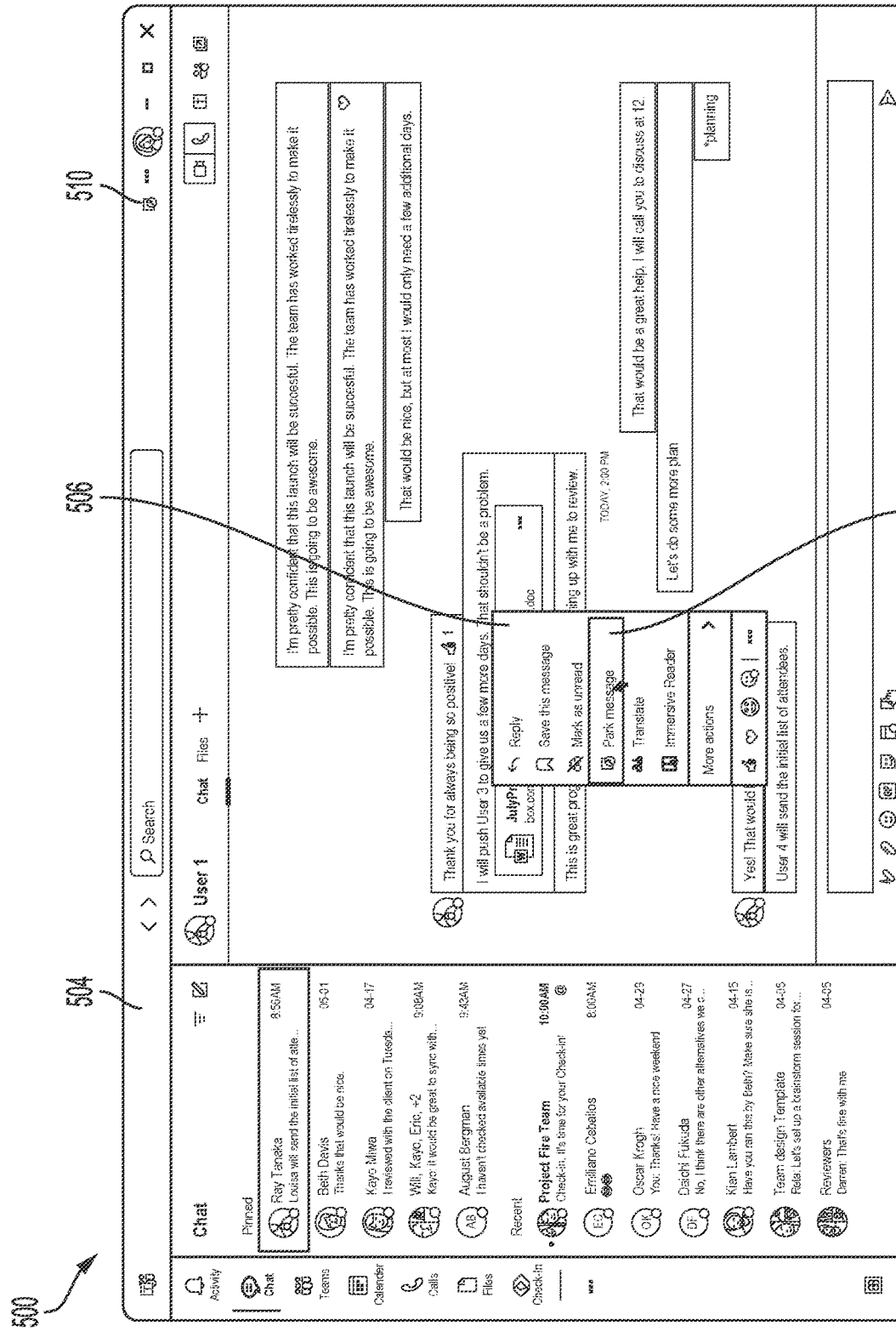
Figure 5C:
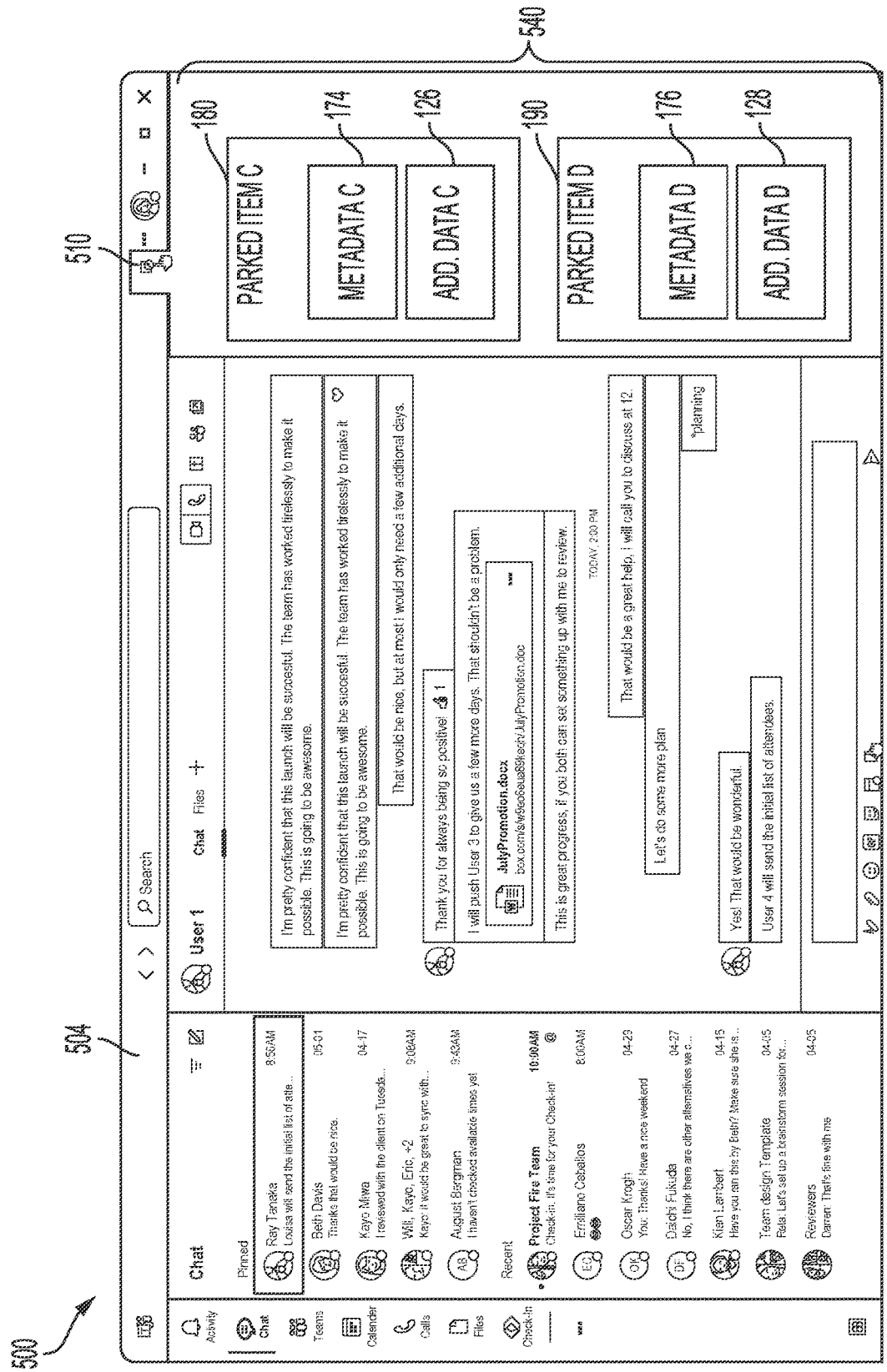

FIGS. 5A-C depict an example interface 500 of a collaboration or messaging application 504 in accordance with various embodiments of the present disclosure. The content-deferral application 104 is integrated with the messaging application 504 to allow for messages and/or files to be parked.

In FIG. 5A, the messaging application includes a plurality of messages 503 that have been sent between users in a chat-based setting. In one of the messages, a file has also been included or shared, as indicated by the file representation 501. The file representation 501 may include an additional-functions option 502 (e.g., an ellipsis icon) that, when selected, provides an action menu of additional options for interacting with the corresponding file, such as opening the file or sharing the file. The action menu also includes a defer or park option. The park option, when selected, causes a parked item to be created for the file. Similar to the discussion above, in other examples the park option may be presented in other manners (such as in the representation 501 or in another context menu or ribbon). The interface 500 may also include a park-pane activation icon 510.

Alternatively or additionally, parked items may be created for one or more of the messages 503. For instance, rather than interacting with the file representation 501, an interaction with the message 503 may allow for the message to be parked. For example, upon activation of a context menu 506 for a message 503 (e.g., via right-click, long press, hover, etc.), a park message option 508 may be displayed, as shown in FIG. 5B. When the park message option 508 is selected, a park item is created for the message 503. A notification may also be displayed similar to the notification discussed above.

FIG. 5C depicts an example of the interface 500 with the park pane 540 activated, such as after creation of a parked item or activation of the park-pane activation icon 510. The park pane 540 may be populated similarly to the park pane 440 discussed above. However, the parked items that are displayed, or the order of their display, in the park pane 540 may be different from those in park pane 440 because the messaging application 504 is a different type of application than the application 404. For instance, the parked items displayed in the park pane 540 may be parked items with files that correspond to the messaging application 504. In the example depicted, representations may be displayed for parked item C 180 and parked item D 190. Additional examples of park pane 540 configurations and parked item representations are provided in FIGS. 8A-8J.

Figure 6A:
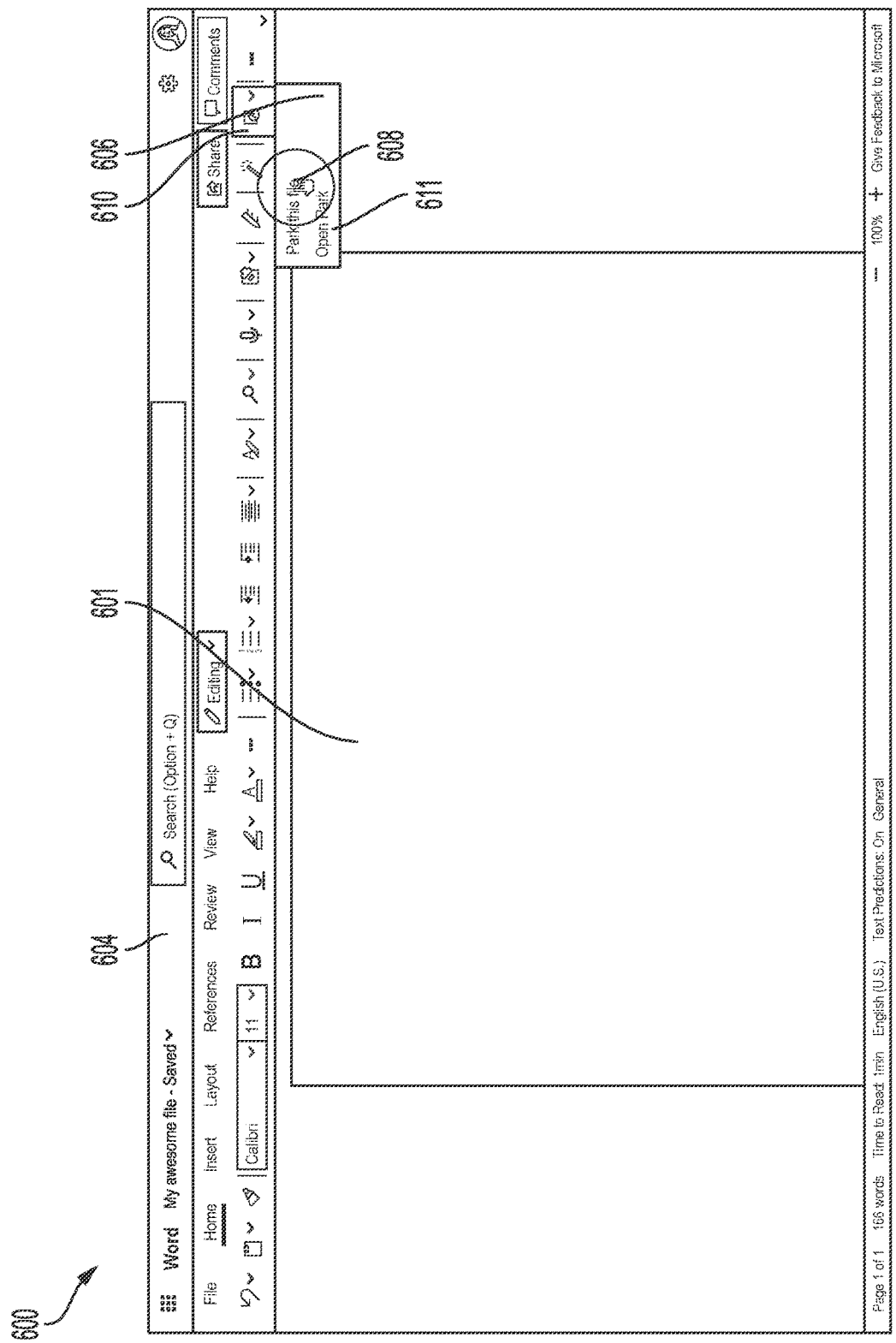
FIGS. 6A-C depict an example interface of a word-processing application in accordance with various embodiments of the present disclosure.
Figure 6B:
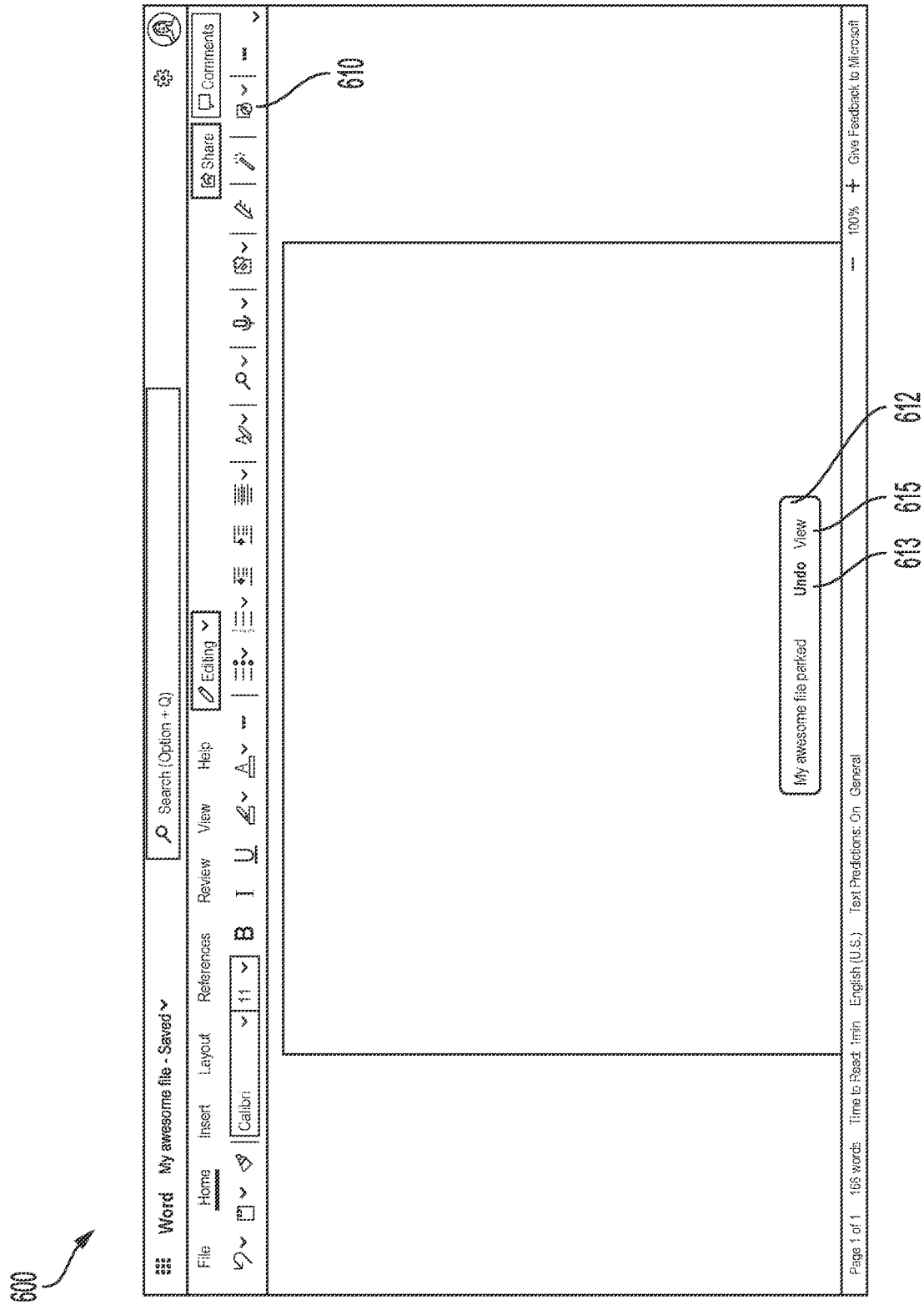
Figure 6C:
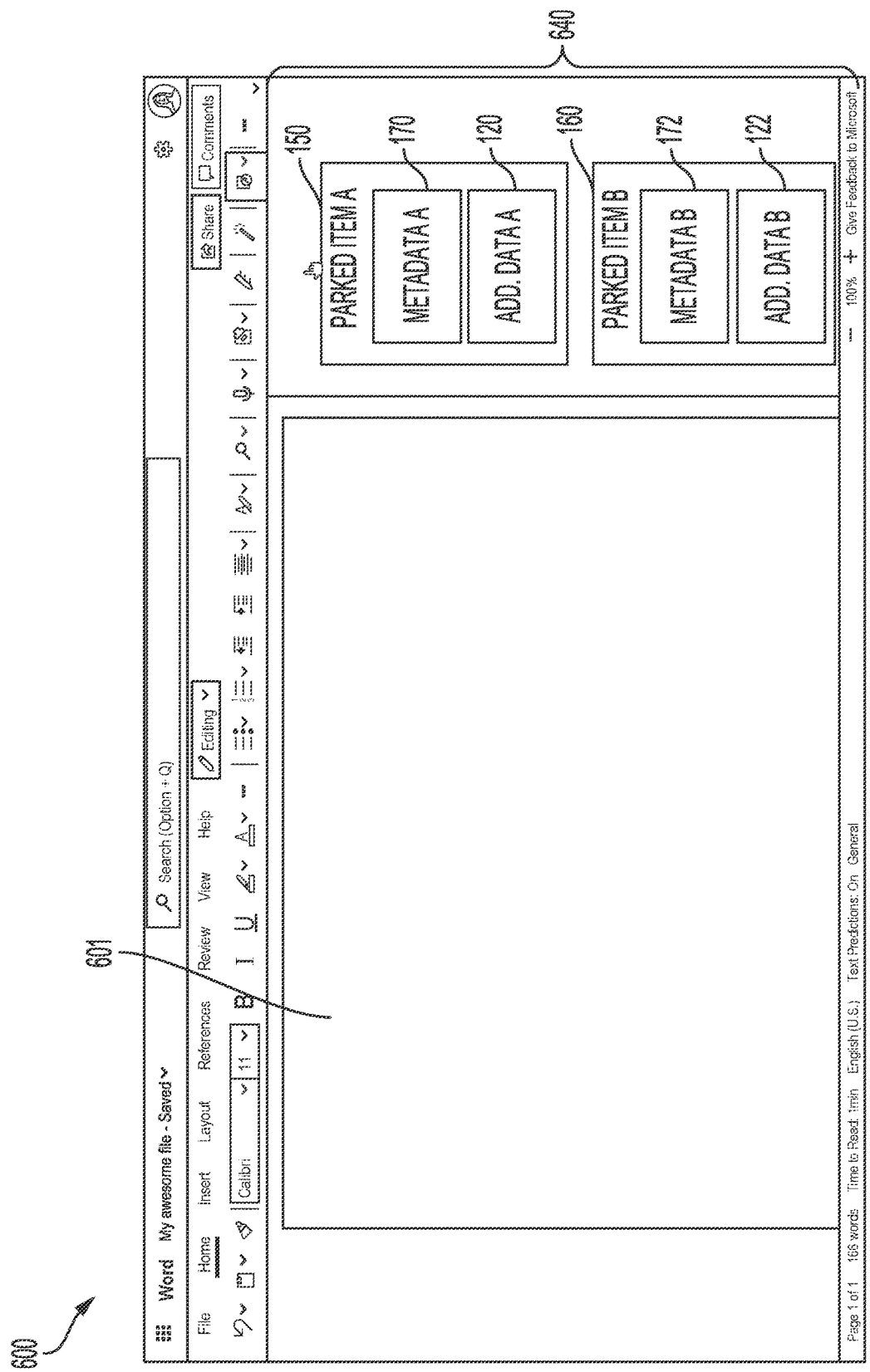

FIGS. 6A-C depict an example interface 600 of a word-processing application 604 in accordance with various embodiments of the present disclosure. The content-deferral application 104 is integrated with the word-processing application 604 to allow for word-processing documents to be parked.

In FIG. 6A, the word-processing application 604 displays an open word-processing document in a content editing portion of the interface 600. Within a ribbon of the interface, the word-processing application 604 includes a selectable park options icon 610. In the example depicted, selection the park options icon 610 causes a drop-down menu 606 to be displayed below the park options icon 610. The drop-down menu 606 may include two options: a park option 608 and park-pane activation option 611. Selection of the park option 608 causes a new parked item to be created for the document 601 that is currently open in the word-processing application 604. Selection of the park-pane activation option 611 causes a park pane to be displayed. In other examples, the park-pane activation option 611 and/or the park option 608 may be displayed in different positions, such as directly in the ribbon and/or in a context menu that is activated from an interaction with the displayed portion of the document (e.g., right click).

When the park option 608 is selected, the new parked item is created and a notification 612 may be displayed, as shown in FIG. 6B. The notification 612 may include the title of the file to convey to the user which file has been parked. The notification 612 may also include an undo option 613 that causes the created parked item to be deleted. The notification 612 may also include a view option 615 that, when selected, causes the created parked item to be displayed. Displaying the parked item may include activating a park pane and/or launching a standalone content-deferral application 104.

FIG. 6C depicts the interface 600 of the word-processing application 604 with the park pane 640 activated. Similar to the park panes discussed above, the park pane 640 can be populated with representations of parked items, such as parked item A 150 and parked item B 160. The parked items displayed within the park pane 640 may be based on context of the word-processing application 604. For instance, the parked items displayed in the park pane 640 may be filtered or sorted such that parked items corresponding to word-processing documents are displayed first. Context of the open document 601 may also be used to filter or sort the parked items for display in the park pane 640. For example, if the open document 601 has a particular tag or category, parked items may be filtered or sorted based on that particular tag or category.

In some examples, the data that is presented in each parked item in the park pane 640 may be copied-and-pasted into the open document 601, which allows for further efficiencies. For example, instead of having to launch a new application or window to find data about another file that has been parked, the data may be readily available within the park pane 840.

Figure 7A:
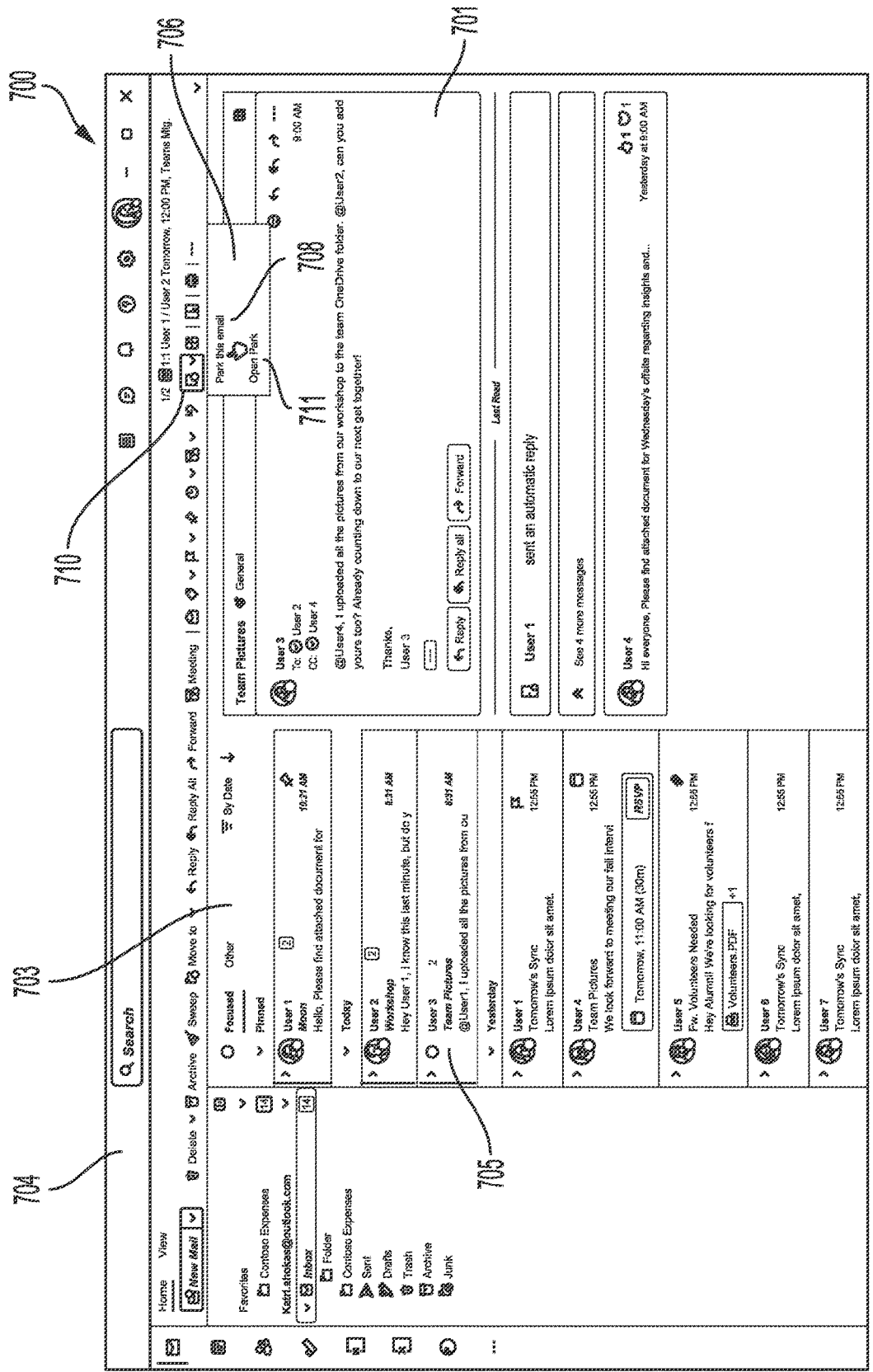
FIGS. 7A-B depict an example interface of an email application in accordance with various embodiments of the present disclosure.
Figure 7B:
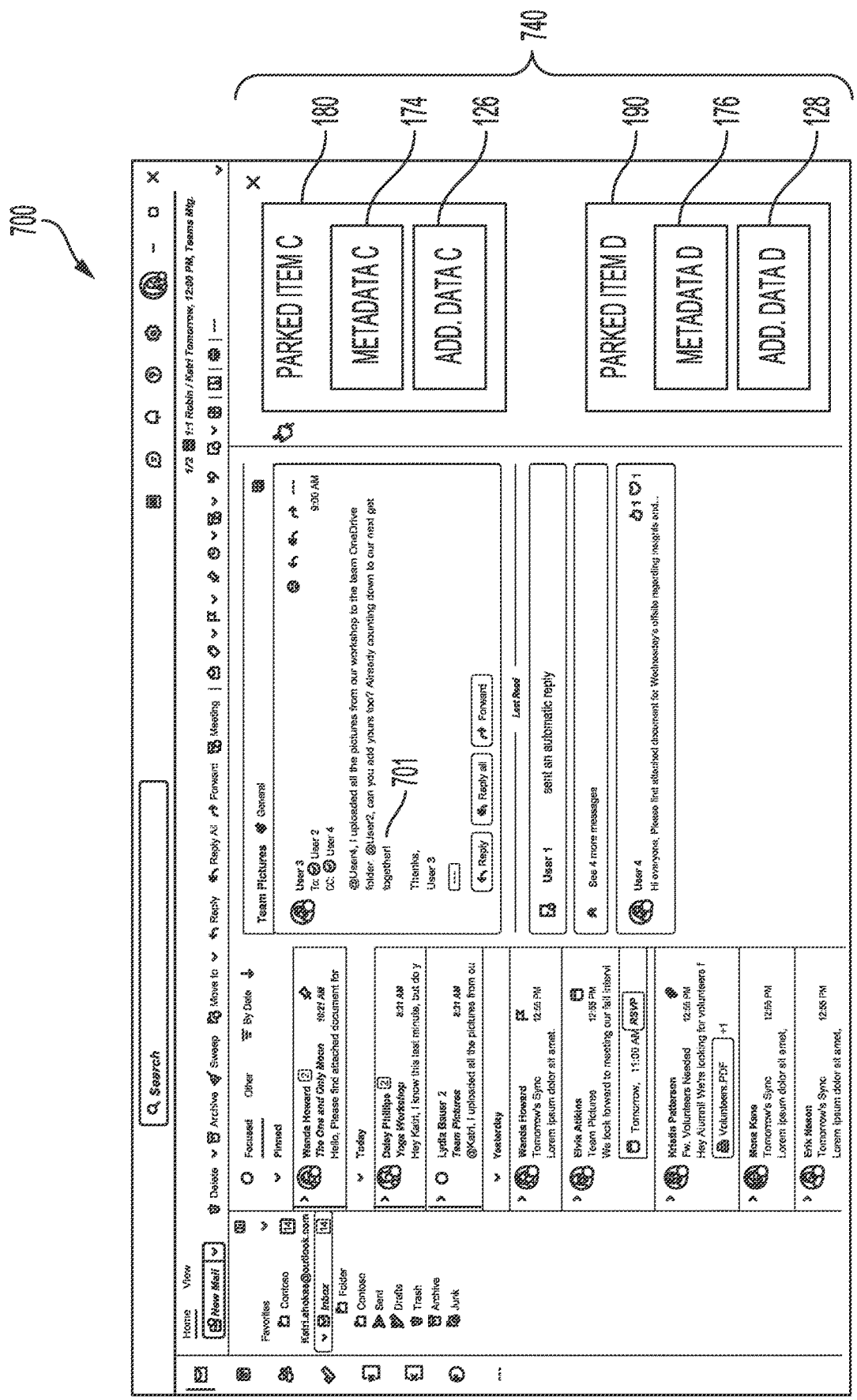

FIGS. 7A-B depict an example interface 700 of an email application 704 in accordance with various embodiments of the present disclosure. The content-deferral application 104 is integrated with the email application 704 to allow for emails to be parked.

In FIG. 7A, the email application 704 displays a listing 703 of email representations 705 of a folder, such as an inbox. Email content 701 from a selected email representation 705 is also concurrently displayed. A park options icon 710 is also provided in a ribbon of the email application 704. In the example depicted, selection the park options icon 710 causes a drop-down menu 706 to be displayed below the park options icon 710. The drop-down menu 706 may include two options: a park option 708 and park-pane activation option 711. Selection of the park option 708 causes a new parked item to be created for the email that is currently open/selected in the email application 704 (e.g., the email for which content is being displayed). Selection of the park-pane activation option 711 causes a park pane to be displayed. In other examples, the park-pane activation option 711 and/or the park option 708 may be displayed in different positions, such as directly in the ribbon and/or in a context menu that is activated from an interaction with the displayed portion of the document (e.g., right click).

In other examples, a user may cause a context menu to be displayed for a particular email in the email list 703 (e.g., by right-clicking, long-pressing, etc.). The context menu may include at least the park option 708. When the park option 708 is selected, a new parked item is created for the email for which the context menu was generated (e.g., the email in the list where the right-click was received).

FIG. 7B depicts the interface 700 of the email application 704 with the park pane 740 activated. Similar to the park panes discussed above, the park pane 740 can be populated with representations of parked items, such as parked item C 180 and parked item D 190. The parked items displayed within the park pane 740 may be based on context of the email application 704. For instance, the parked items displayed in the park pane 740 may be filtered or sorted such that parked items corresponding to emails are displayed first. Context of the selected email 701 may also be used to filter or sort the parked items for display in the park pane 740. For example, if the selected email has a particular tag or category, parked items may be filtered or sorted based on that particular tag or category.

Figure 8A:
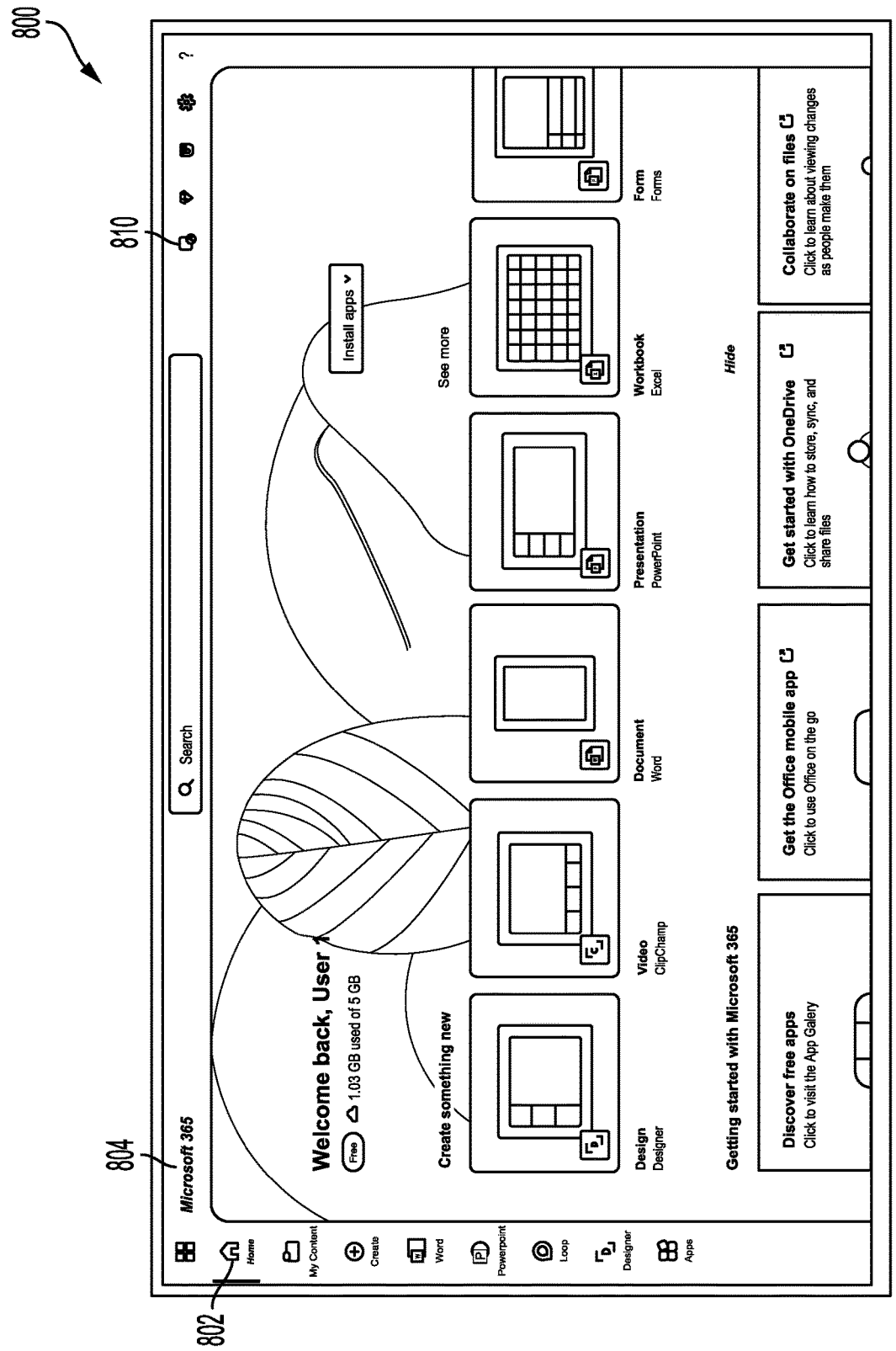
Figure 8B:
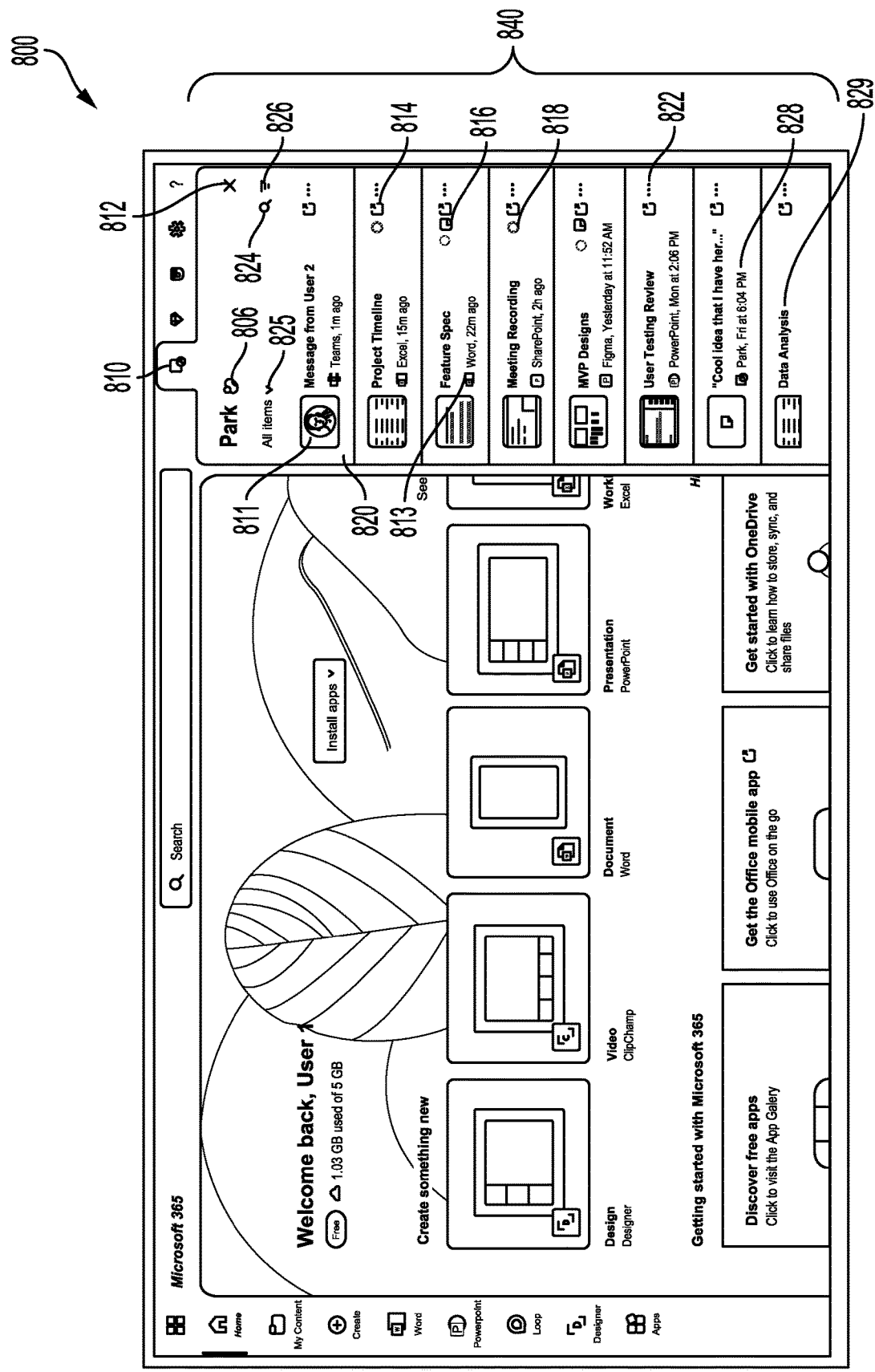

FIGS. 8A-8L depict example interfaces of a sidebar or park pane according to various examples of the present technology. FIG. 8A depicts an example interface 800 of a file-accessing application 804, in a home 802 state, through which a park pane may be accessed. The file-accessing application 804 may be cloud-based service platform that incorporates a portfolio of applications, tools, and/or other services. For instance, the application 804 may include a park-pane activation icon 810 that, when selected, causes a park pane 840 to be displayed, as shown in FIG. 8B.

FIG. 8B depicts an example content-deferral sidebar or park pane 840 that includes multiple parked item representations 820. In addition to the parked item representations 820, the park pane 840 may also include search icon 824 and a filter icon 826. The search icon 824 allows for searching for parked items and may function similarly to the search icon 206 discussed above. The filter icon allows for filtering parked items and may operate similarly to filter icon 208 discussed above. A category selection menu 825 may also be provided in the park pane 840, which allows for a category of parked items to be selected. The category selection menu 825 may operate similarly to the category filter options 280 discussed above. The park pane 840 may also include a selectable note icon 806 for creating a new note and corresponding parked item for the note. The selectable note icon 806 may operate similarly to the selectable note icon 204 discussed above. A close option 812 may also be presented. Selection of the close option 812 causes the park pane 840 to close.

The parked item representations 820 may include details and features similar to the parked item representations 220 discussed above with reference to FIG. 2. For example, the parked item representations 820 may each include a description or title 829 of the file corresponding to the parked item. A content preview 811 may also be included in the parked item representation. The content preview 811 provides a preview or an image of content of the file associated with the parked item. The image of the content of the file may be stored as part of the metadata for the file. In some examples, the content preview 811 may be an image associated with the file. For instance, when the parked item is for a message, the content preview may be an image of the user(s) who sent the message.

The parked item representation 820 may include content type indicator 813 that indicates a type of file for which the parked item corresponds. The content type indicator 813 may be an icon of an application for which the file of the parked item corresponds and/or the application that would be used to open the corresponding file. For instance, the content type indicator 813 may be an icon of a word-processing application where the file of the parked item is a word-processing document. A recent activity indicator 828 may also be provided that indicates recent activity relating to the parked item and/or the file corresponding to the parked item. For example, the recent activity indicator 828 may indicate the time at which the file was last created or modified.

A category label or indicator 818 may also be provided in the parked item representation 820. The category indicator 818 indicates the category for the parked item, which may be stored as additional data of the parked item and/or as metadata of the corresponding file. As a result, the park pane 840 provides sufficient identifying and contextual information about each parked item to be meaningful to a user without requiring the user to open the original file associated with the parked item.

The parked item representation 820 also includes action icons for actions that may be performed on the parked item representation 820 and/or the parked item. The parked item representation 820 may also include a launch icon 814 that, when selected, causes the file associated with the parked item to be launched in its corresponding application (e.g., a spreadsheet application where the file is a spreadsheet document).

A note icon 816 may also be included where are note has been previously created for the particular parked item. Selection of the note icon 816 reveals the content of the note associated with the parked item. A note interface for altering or editing the note may also be displayed.

In some examples, the order of the parked item representations 820 may be adjusted by the user. For instance, one parked item representation 820 may be dragged-and-dropped into a new position with the list of parked item representations 820. The ordering of the parked item representations may also be stored as additional data within the parked item such that the ordering is stored in the content-deferral platform. Thus, when the parked items are accessed at a later time, the ordering of the parked items may remain the same.

FIG. 8C depicts an example park pane 840 after selection of the additional-functions indicator 822. Based on a selection of the additional-functions indicator 822, an action menu 834 may be displayed over a portion of the parked item representation 820. In other examples, the action menu may be activated by a secondary selection of a parked item representation 820, such as a right-click, long press, etc.

The action menu 834 includes an open action element 836 that indicates an application for which the file corresponding to the parked item may be opened. In the example depicted, the parked item is a word-processing document and the action element 836 indicates that the document would be opening in a word-processing application. Selection of the open action element 836 causes the file associated with the parked item to be opened in the indicated application. Additional action elements 838 may also be provided in the action menu 834. The additional actions may include a share action element 835, a category change element 837, and an archive element 838. Selection of the archive element 838 causes the corresponding parked item to be archived or deleted.

The share action element 835 provides functionality for sharing the parked item. For instance, selection of the share action element 835 may present additional fields or options for providing contact or other identifying information of another user with which the parked item is to be shared. Upon confirmation, the parked item is then shared with the identified other users. Sharing the parked item may entail providing the other user(s) with access to the parked item stored remotely in a cloud storage platform (e.g., the content-deferral platform 118) and/or sending a copy of the parked item (e.g., the data structure including the metadata and additional data).

In some examples, the category change element 837 changes state based on whether the parked item already has an associated category. In the example depicted, the parked item already has a category of "Current Project" associated with the note. Accordingly, because the parked item already has an associated category, the category change element 837 indicates the current category, and when the category change element 837 is selected, the categorization of the parked item may be removed or options for selecting a different category may be displayed.

FIG. 8D depicts an example park pane 840 and an action menu 834 for a different parked item that did not previously have a category assigned. Where the parked item does not have a category assigned, the category change element 837 changes state to allow for a category to be added. When the category change element 837 is selection, a category options panel 844 may be displayed that provides categories for selection and/or the ability to define a new category or search for other categories. In the example depicted, the "Reference" category is selected, and a category indicator 818 is added to the current parked item representation 820.

FIG. 8E depicts an example park pane 840 when the category selection menu 825 is selected. Selection of the category selection menu 825 may cause a category selection menu 846 to be displayed. The category selection menu 846 may include categories for parked items that are available to the user. Selection of one of the categories causes the displayed parked item representations 820 to filtered according to the selected category.

FIG. 8F depicts an example park pane 840 and an action menu generated for a parked item that does not have previous associated note in the additional data of the parked item. For instance, because the parked item does not have a previously associated note, the action menu 834 provides a note generation option 849. Selection of the note generation option 849 provides an interface for adding a note to the parked item.

FIG. 8G depicts an example park pane 840 where a content preview 811 of a parked item representation 820 is being selected. When the content preview 811 is selected, the parked item representation 820 expands to show more information about the parked item, as shown in FIG. 8H.

FIG. 8H depicts an expanded parked item representation 854. The expanded parked item representation 854 includes an expanded content preview 855 that may show further images of corresponding file, such as additional page previews for the file. The expanded content preview 855 may be scrollable to view more of the preview. An expansion indicator 857 may also be displayed within the expanded content preview 855. Selection of the expansion indicator 857 causes further expansion of the expanded content preview 855.

FIG. 8I depicts an example park pane 840 where a note icon 816 is selected within an expanded parked item representation 854. Selection of the note icon 816 causes the associated note 860 to be displayed within the expanded parked item representation 854. The note may then be edited from within the parked item representation.

FIG. 8J depicts an example park pane 840 with after the expansion element 857 has been selected. When the expansion element 857 is selected, the expanded content preview 855 is further enlarged and the overall size of the parked item representation further expands to become an overlaid parked item representation 858 where the content preview that includes a further enlarged content preview 866. The further enlarged content preview 866 and the overlaid parked item representation may be displayed as an overlay of other parked item representations 820 within the park pane 840. The further enlarged content preview 866 may be scrolled or paged in some examples. The enlarged content preview 866 may include a further expansion icon 862 as well.

Figure 8L:
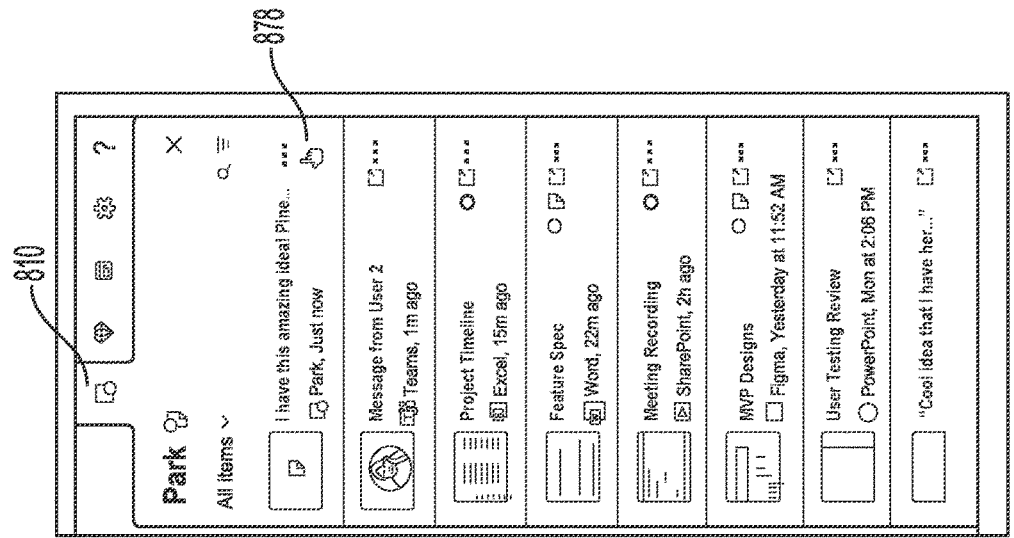
Figure 8K:
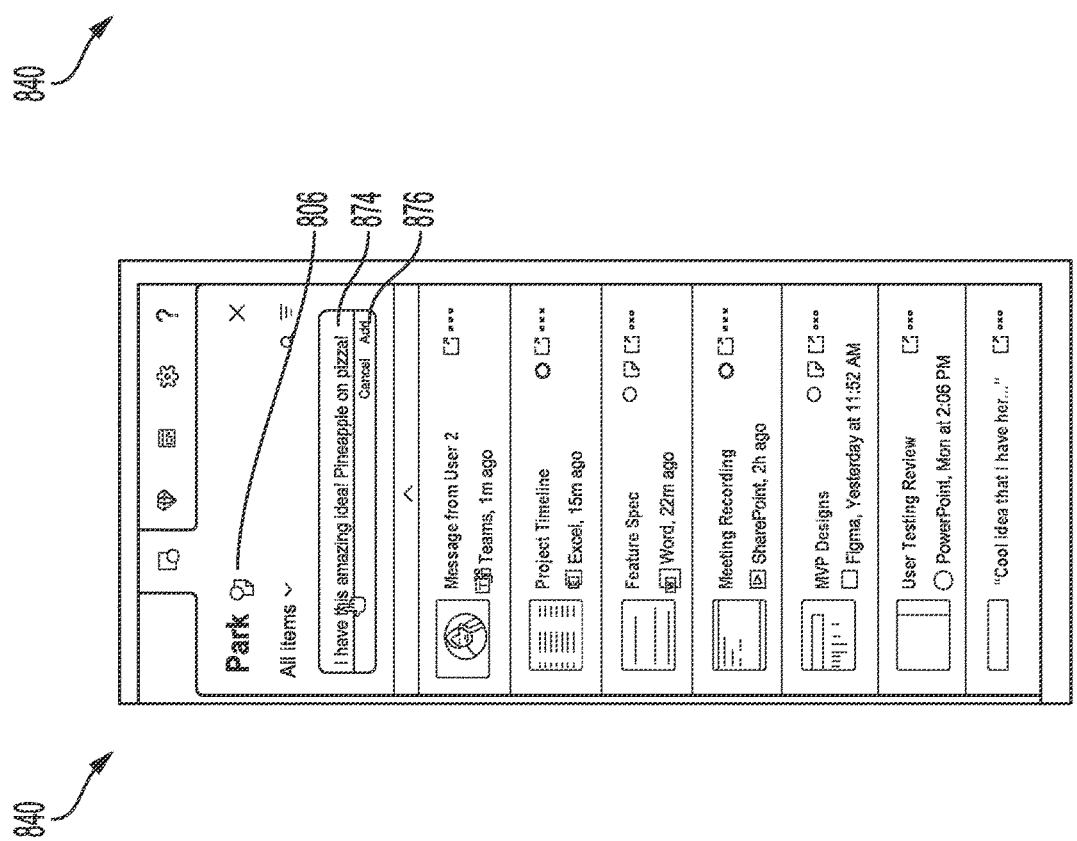

FIG. 8K depicts an example park pane 840 when the selectable note icon 806 has been selected. Selection of the selectable note icon 806 cause a new note element 874 to be displayed where text can be entered for a new note. Once text for the note has been entered into the new note element 874, a confirm or add element 876 may be selected to cause a new park item to be generated for the note. FIG. 8L depicts an example park pane 840 after a new parked item is created for a newly generated note, such as the note generated in FIG. 8K. The new parked item 878 is represented by the new parked item representation 878.

Figure 9A:
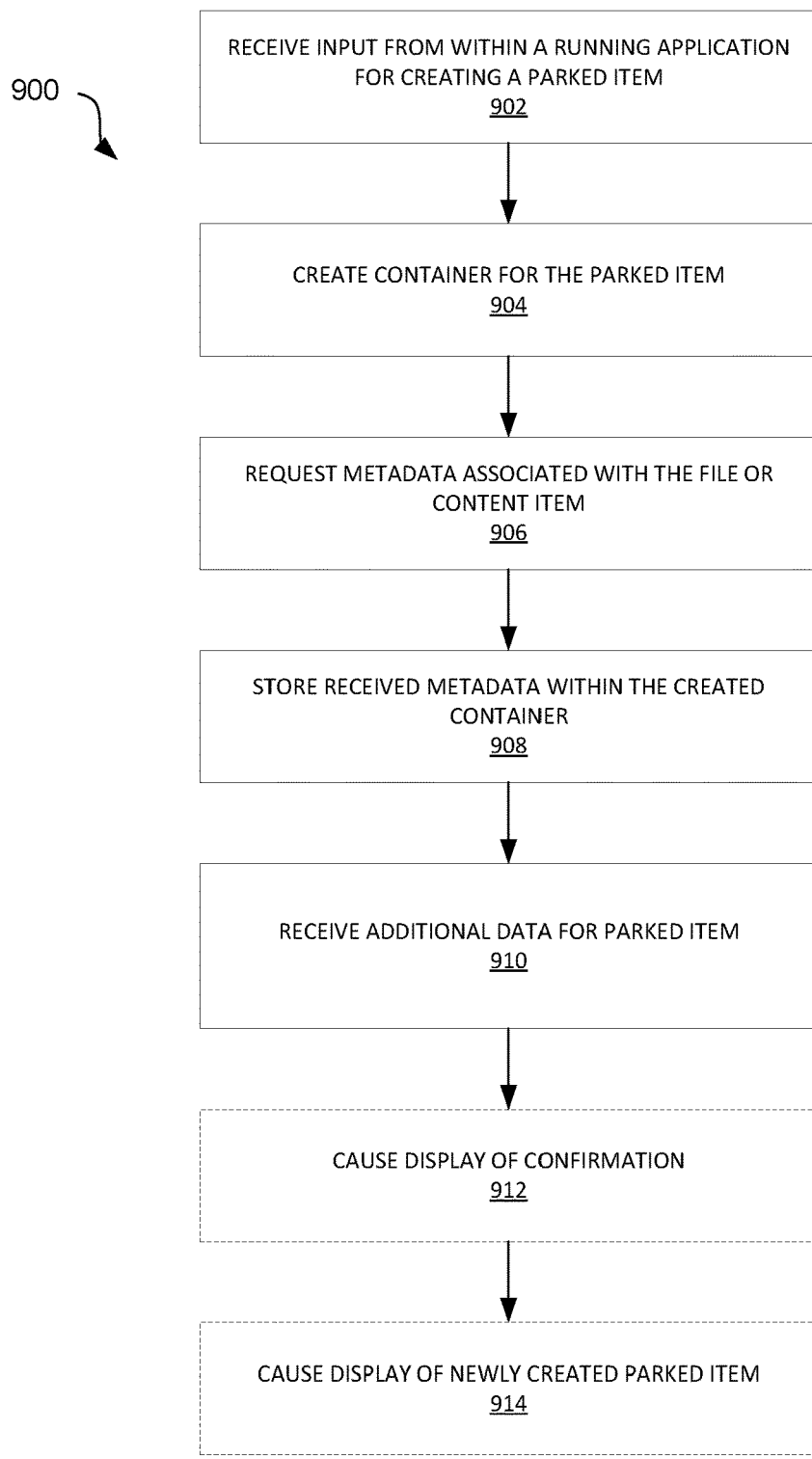
FIG. 9A depicts an example method for creating parked items in accordance with various embodiments of the present disclosure.

FIG. 9A depicts an example method 900 for deferring content and creating a parked item in accordance with various embodiments of the present disclosure. The example method 900 may be performed by a content-deferral application operating on a client device and/or a web-based content-deferral application operating on a server and causing the display of application features through a web browser.

At operation 902 an input is received from within a running application for creating a parked item for a file or content item. The file or content item may be open, displayed, or selected within the running application. For example, the input may be a user selection of a park option, as discussed above. For instance, when a file or content item is displayed within the running application (e.g., messaging application, email application, video application, productivity application), the park option may be selected from an action menu, context menu, or ribbon of the application.

In other examples, the trigger for creating a parked item may be automatically performed by the content-deferral application. For instance, the content-deferral application may monitor or track various processes, activities, or interactions between files and applications during their use, or the content-deferral application may receive signals that indicate similar usage data. For example, upon an open file not receiving any interactions for a threshold period of time and still remaining open within an application, a parked item may automatically be created for the file. In some examples, a prompt may be generated requesting confirmation that the parked item should be created.

Based on the input or trigger to create the parked item, a new data structure or container for the parked item is created at operation 904. The container for the parked item includes fields for metadata and/or additional data for the file or content item that was displayed or selected from the running application. For example, the data structure may be the data structure described above in FIG. 1.

At operation 906, metadata for the file or content item is requested. The metadata for the file or content item may be requested from the running application which may have access to the metadata and/or from a remote server where the metadata is stored. For instance, a metadata storage layer of a storage platform may be queried for the metadata of the file. The query may be in the form of a unique identifier for the file, such as global unique identifier (GUID). The metadata may then be received and stored within the data container for the parked item at operation 908.

Additional data for the parked item may then be received or generated at operation 910. The additional data may include a note or annotation that is generated based on input from the user. The additional data may also include a category for the parked item, which may be added via input from the user or automatically generated.

A confirmation notification that the parked item has been created may be caused to be displayed at operation 912. The confirmation notification may be displayed prior to receiving the additional data in some instances.

At operation 914, a parked item representation for the newly created parked item is caused to be displayed. For instance, the parked item representation may be displayed in a park pane or with in a standalone content-deferral application.

Figure 9B:
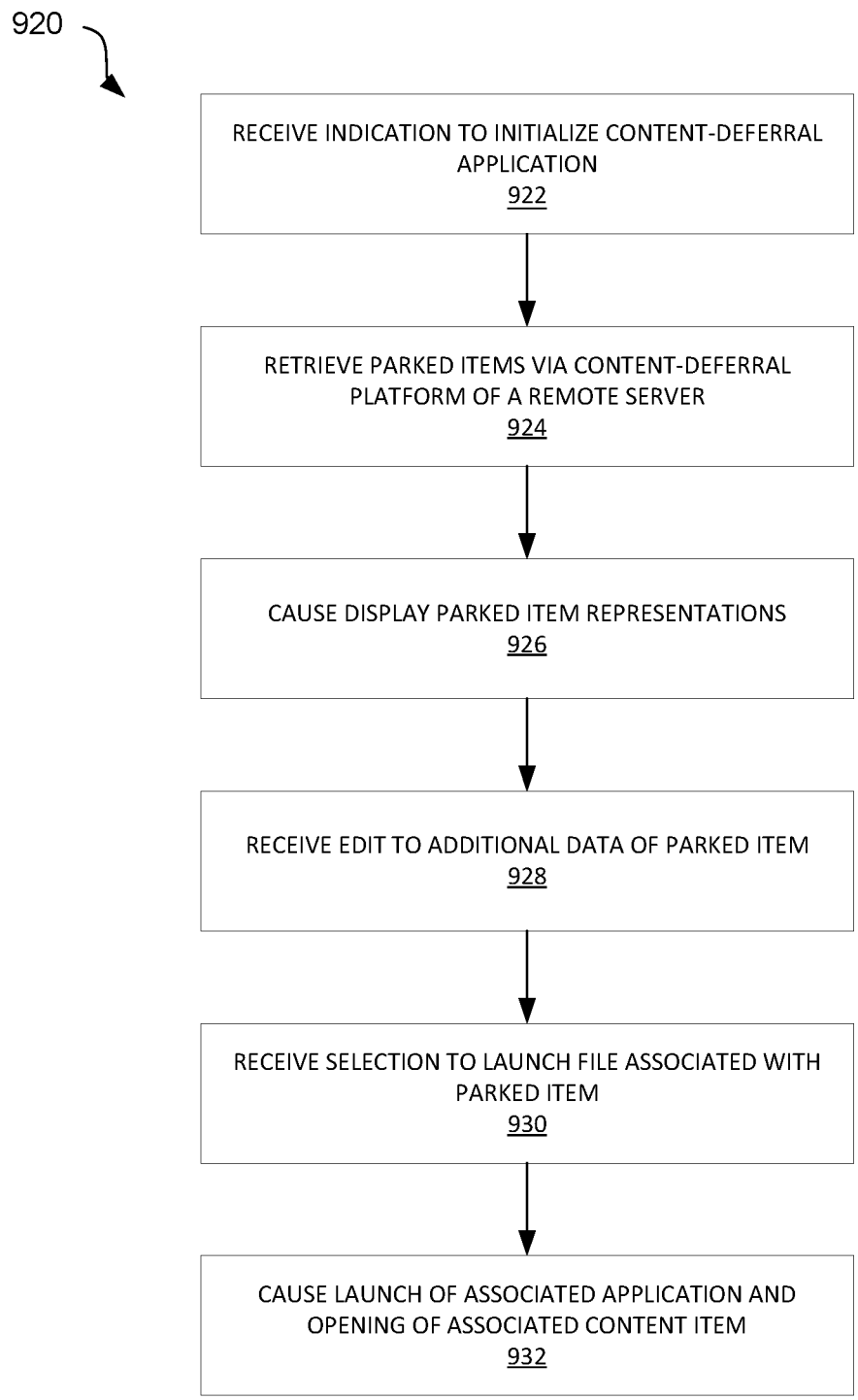
FIG. 9B depicts an example method for accessing parked items in accordance with various embodiments of the present disclosure.

FIG. 9B depicts an example method 920 for accessing parked items in accordance with various embodiments of the present disclosure. At operation 922, an indication to initialize a content-deferral application on a client device is received. Initializing the content-deferral application may include launching a standalone content-deferral application or a park pane within another application. The indication to initialize the content-deferral application may be receiving a selection to launch the standalone content-deferral application or a selection of a user interface element to launch the park pane.

At operation 924, parked items are retrieved from a content-deferral platform on a server remote from the client device. The parked items may be retrieved based on a user that is signed into the client device, the content-deferral application, and/or the application in which the park pane is activated. For instance, each user may be associated with a different set of parked items that the particular user has created (or that has been shared with the user). The parked items may also be retrieved based on context of the content-deferral application. For instance, if the content-deferral application is launched as a standalone application, all parked items may be retrieved.

In an example, the content-deferral application is launched as a park pane in a productivity application, the parked items may be retrieved based on context of the productivity application. For instance, where the park pane is activated in a word-processing application, parked items corresponding to word-processing documents may be retrieved.

In yet other examples, where the content-deferral application is launched as a park pane within another application, the parked items that are retrieved are based on the context of a file or content item that is open within the application. For instance, if the opened file is associated with a particular category, parked items matching that category may be retrieved. In other examples, if the opened file or message is associated with another user (e.g., shared with another user, received from another user), parked items for files that are also associated with that user may be retrieved.

Retrieving the parked items may include transmitting a query to the content-deferral storage platform. The query criteria may include the context of the application, document, and/or content item. For instance, the query may include a value for a document type. The content-deferral platform executes the query against the metadata stored in the parked items and returns parked items that match the query criteria.

At operation 926, the retrieved parked items are caused to be displayed on the client device, either in the standalone content-deferral application or in the park pane. The parked items may be displayed as a parked item representations and have the features of the parked item representations discussed above.

At operation 928, an edit to additional data of the parked item is received via user input. For instance, a note for a parked item may be added or edited, a category of the parked item may be added or edited, and/or an ordering of the parked item may be adjusted. Such edits may be stored in the content-deferral platform on the remote server such that they can be accessed at subsequent time or by a different client device.

At operation 930, a selection to launch a file or content item associated with a parked item is received. For instance, a selection of a launch icon from within a parked item representation may be selected. Based on receiving the selection to launch the file or content item, the content-deferral application causes the application corresponding to the file type of the file or content item type to be launched and the file or content item loaded with the launched application at operation 932.

Figure 9C:
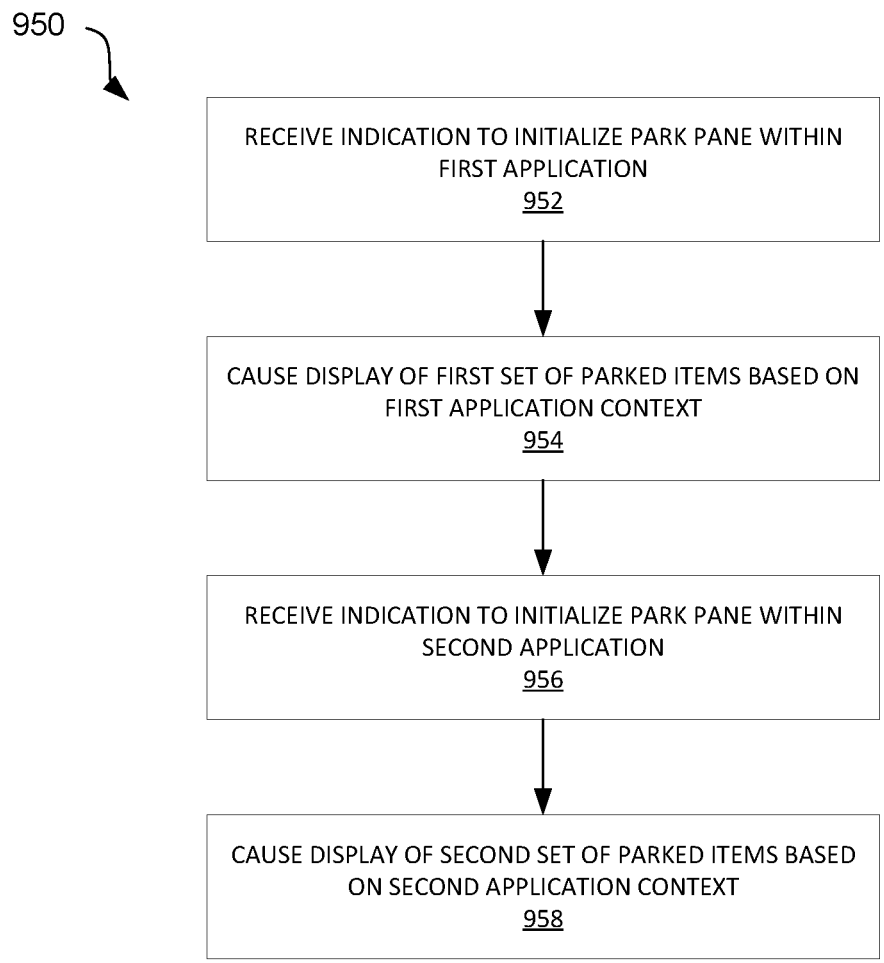
FIG. 9C depicts an example method for accessing parked items from multiple applications in accordance with various embodiments of the present disclosure.

FIG. 9C depicts an example method 950 for accessing parked items from multiple applications in accordance with various embodiments of the present disclosure. At operation 952, an indication is received to initialize a park pane within a first application that has a first application type (e.g., messaging application, video application, communication application, word-processing application). Based on receiving the indication to initialize the park pane in the first application, parked item representations for a first set of parked items are caused to be displayed in the park pane, at operation 954, based on a context of the first application, such as the application type. For instance, the first set of parked items may be parked items having files or content items corresponding to the application type of the first application. The first set of parked items may be displayed prior to, or above, other parked items. Accordingly, the context may be used for sorting and/or filtering the parked item representations.

At operation 956, an indication is received to initialize a park pane within a second application having a second application type that is different from the first application type. Based on receiving the indication to initialize the park pane in the second application, parked item representations for a second set of parked items are caused to be displayed in the park pane, at operation 958, based on a context of the second application, such as the application type. The second set of parked items may be different than the first set of parked items.

Figure 10:
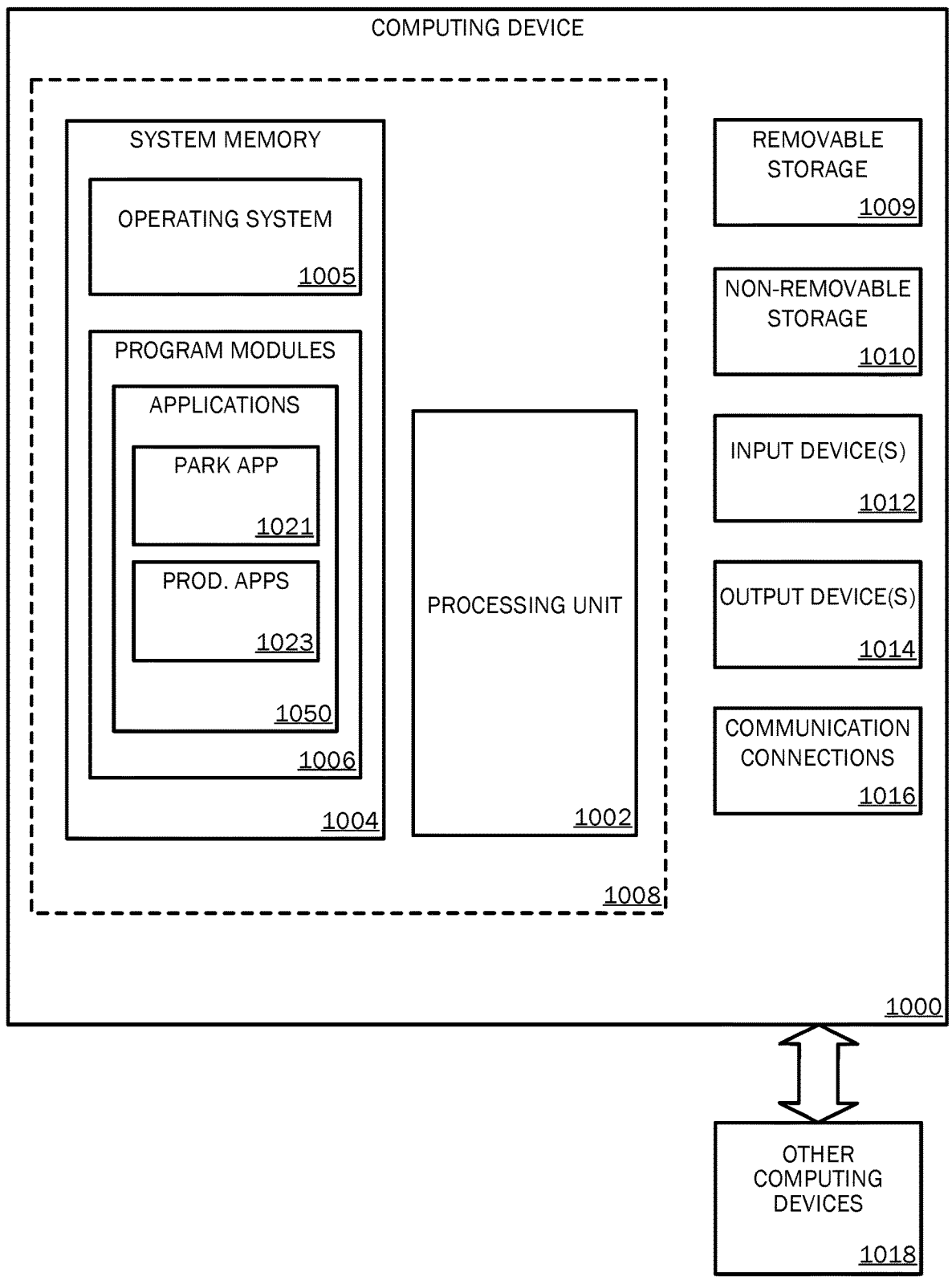
FIG. 10 is a block diagram illustrating example physical components of a computing device with which aspects of the technology may be practiced.

FIG. 10 is a block diagram illustrating physical components (i.e., hardware) of a computing device 1000 with which examples of the present disclosure may be practiced. The computing device components described below may be suitable for a client device running the web browser discussed above. In a basic configuration, the computing device 1000 may include at least one processing unit 1002 and a system memory 1004. The processing unit(s) (e.g., processors) may be referred to as a processing system. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running software applications 1050 such as the park application 1021 and productivity applications 1023.

The operating system 1005, for example, may be suitable for controlling the operation of the computing device 1000. Furthermore, aspects of the invention may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 may perform processes including, but not limited to, one or more of the operations of the methods illustrated in FIGS. 8-9. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 1000 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 1000 may also have one or more input device(s) 1012 such as a keyboard, a mouse, a pen, a sound input device, a touch input device, etc. The output device(s) 1014 such as a display, speakers, a printer, etc. may also be included. The aforementioned devices are examples and others may be used. The computing device 1000 may include one or more communication connections 1016 allowing communications with other computing devices 1018. Examples of suitable communication connections 1016 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
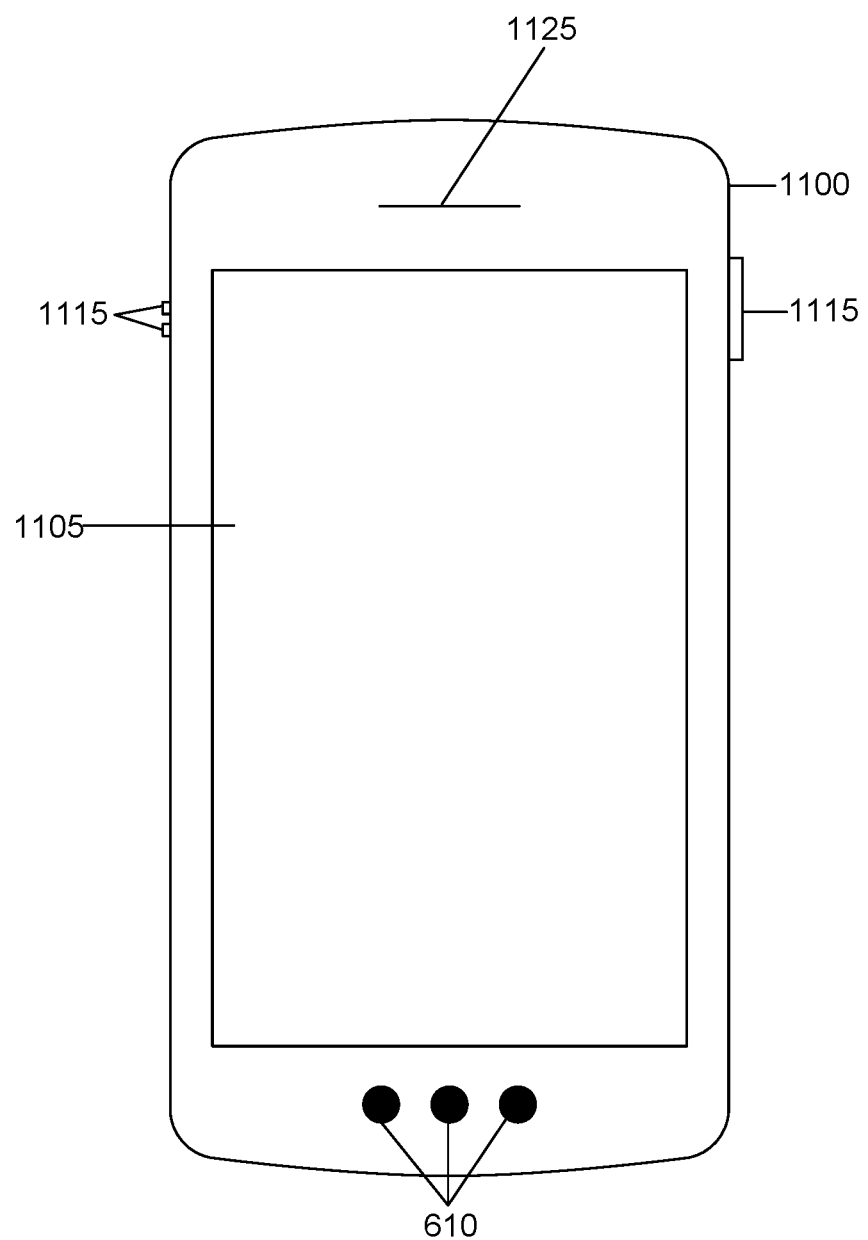
FIGS. 11A and 11B are simplified block diagrams of a mobile computing device with which aspects of the present technology may be practiced.
Figure 11B:
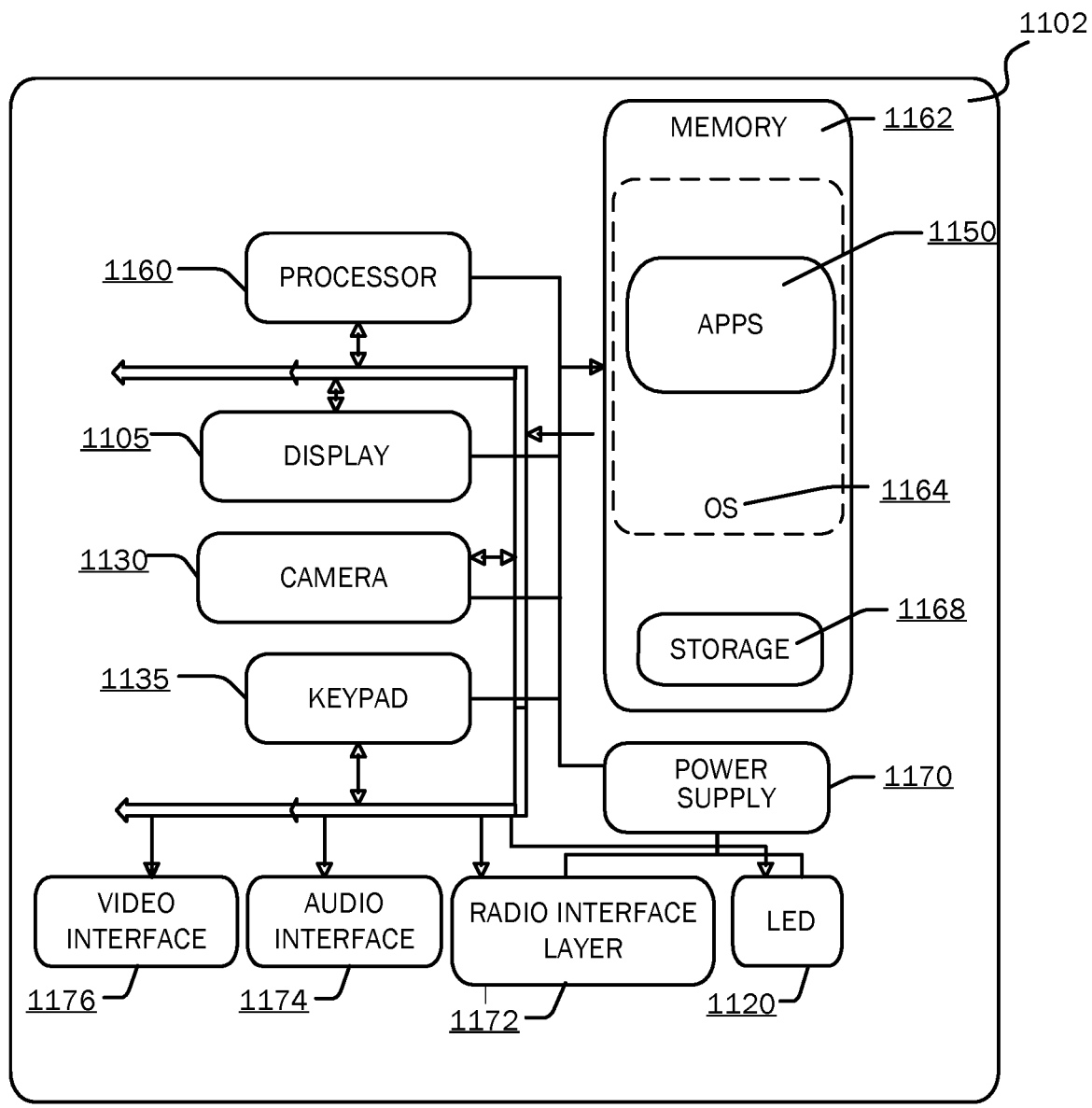

FIGS. 11A and 11B illustrate a mobile computing device 1100, for example, a mobile telephone, a smart phone, a tablet personal computer, a laptop computer, and the like, with which aspects of the invention may be practiced. With reference to FIG. 11A, an example of a mobile computing device 1100 for implementing at least some aspects of the present technology is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, optional side input elements 1115 allows further user input. The side input elements 1115 may include buttons, switches, or any other type of manual input elements. In alternative examples, mobile computing device 1100 may incorporate more or less input elements. Key input may generally be received from a soft keyboard displayed on the display 1105, but in other examples, the mobile computing device 1100 may also include an optional physical keypad. Optional keypad 1135 may be a physical keypad or a "soft" keypad generated on the touch screen display. One or more audio transducers 1125 (e.g., speakers) may also be included. In some examples, the mobile computing device 1100 incorporates a vibration transducer for providing the user with tactile feedback. In yet another example, the mobile computing device 1100 incorporates input and/or output ports, such as an audio input (e.g., a microphone jack), an audio output (e.g., a headphone jack), and/or a video output for sending signals to or receiving signals from an external device.

FIG. 11B is a block diagram illustrating the architecture of one example of a mobile computing device. That is, the mobile computing device 1100 can incorporate a system (i.e., an architecture) 1102 to implement some examples. In one example, the system 1102 is implemented as a "smart phone" capable of running one or more applications (e.g., videoconference or virtual meeting application, web browser, e-mail, calendaring, contact managers, messaging clients, games, and media clients/players). In some examples, the system 1102 is integrated as a computing device, such as an integrated personal digital assistant (PDA) or wireless phone.

One or more application programs 1150 may be loaded into the memory 1162 and run on or in association with the operating system 1164. Examples of the application programs include videoconference or virtual meeting programs, phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1150 may use and store information in the non-volatile storage area 1168, such as e-mail or other messages used by an e-mail application, and the like. A synchronization application (not shown) may also reside on the system 1102 and is programmed to interact with a corresponding synchronization application resident on a host computer to keep the information stored in the non-volatile storage area 1168 synchronized with corresponding information stored at a remote device or server. As should be appreciated, other applications may be loaded into the memory 1162 and run on the mobile computing device 1100.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio 1172 that performs the function of transmitting and receiving radio frequency communications. The radio 1172 facilitates wireless connectivity between the system 1102 and the "outside world," via a communications carrier or service provider. Transmissions to and from the radio 1172 are conducted under control of the operating system 1164. In other words, communications received by the radio 1172 may be disseminated to the application programs 1150 via the operating system 1164, and vice versa.

The visual indicator 1120 may be used to provide visual notifications and/or an audio interface 1174 may be used for producing audible notifications via the audio transducer 1125. In the illustrated example, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio 1172 or via a distributed computing network. Similarly, such data/information may be readily transferred between computing devices for storage and use according to data/information transfer and storage means, including electronic mail and collaborative data/information sharing systems.

As will be understood from the foregoing disclosure, many technical advantages and improvements result from the present technology. For instance, the present technology provides for significant improvement in computing resources associated with accessing pertinent information associated with parked content or parked items. In an aspect, the technology relates to a system for reviewing parked content via a park pane interface of the web-based park app in various other productivity applications. This pane enables review and resumption of content previously deferred effectively and efficiently. In this way, the resource intensive aspect associated with reidentifying content at a later time through searches and multiple window switching actions. In addition, the parked items use of metadata rather than the entire file corresponding to the parked item results in bandwidth savings in transmitting and received the parked items.

In an example, the technology relates to a system for deferring content. The system includes a processor; and memory storing instructions that, when executed by the processor, cause the system to perform operations. The operations include receiving an input from within an application executing on a client device to create a parked item for a content item displayed within the application; creating a data container, in a content-deferral platform, for the parked item; requesting, from remote storage platform, metadata associated with the content item; storing the metadata associated with the content item in the data container; causing a display of a representation of the parked item; receiving, via interactions with the parked item representation, additional data for the parked item; and storing the additional data in the data container for the parked item at the content-deferral platform.

In an example, the application is one of a messaging application, a communication application, a video application, or a productivity application. In another example, the operations further include causing a display of a park pane within the application; and wherein display of the representation of the parked item is within the park pane of the application. In still another example, the representation of the parked item includes at least three of a content preview, a content type indicator, a title, a recent activity indicator, a category indicator, a note icon, or a launch icon. In yet another example, the representation of the parked item includes a note generation icon and the operations further include receiving a selection of the note generation icon; based on receiving the selection of the note generation icon, causing a display of a note editing interface element, within the representation of the parked item, for receiving text for a note of the parked item; receiving text for the note in the note editing interface; and storing the note as the additional data for the parked item.

In another example, the application is a first application and the operations further include receiving a launch indication for a park pane within a second application; and causing a display of the representation of the parked item associated with the first application in the park pane. In still another example, the data container includes defined metadata fields for metadata supported by the content-deferral platform, and storing the metadata associated with the content item includes filling the defined metadata fields with the received metadata. In a further example, the representation of the parked item includes a category indicator indicating a category for the parked item.

In another aspect, the technology relates to a computer-implemented method for accessing deferred content. The method includes receiving an indication to initialize a park pane in a productivity application on a client device; based on receiving the indication to initialize the park pane, retrieving parked items from a content-deferral platform of a remote server, wherein each parked item includes a data container of each parked item includes metadata for a content item and additional data for the parked item; and causing a display of the park pane including the parked item representations for the retrieved parked items, wherein each of the parked item representations include at least three of a content preview, a content type indicator, a title, a recent activity indicator, a category indicator, a note icon, or a launch icon.

In an example, the additional data includes at least one of a note or a category for the parked item. In another example, the content preview, the content type indicator, and the title are based on the metadata stored in the parked item; and the category indicator and the note icon are based on the additional data stored in the parked item. In still another example, the productivity application is one of a word-processing application, a spreadsheet application, or a presentation application. In yet another example, the at least one of the retrieved parked items is for a file stored in a remote storage platform, and retrieving the parked items includes querying the remote storage platforms for updates to metadata of the file. In still another example, the parked items are retrieved based on an application type of the productivity application. In still yet another example, the method further includes receiving an interaction with the representation of the parked item; and based on receiving the interaction, adjusting the representation to be an expanded representation of the parked item.

In another aspect, the technology relates to a computer-implemented method for accessing deferred content. The method includes receiving an indication to initialize a first park pane within a first application having a first application type; based on receiving the indication to initialize the first park pane, causing a display of first parked item representations, within the first park pane, for a first set of parked items, wherein the first set of parked items are based on the first application type; receiving an indication to initialize a second park pane within a second application having a second application type different than the first application type; and based on receiving the indication to initialize the second park pane, causing a display of second parked item representations, within the second park pane, for a second set of parked items, wherein the second set of parked items are based on the second application type.

In an example, the first application is one of a messaging application or a communication application, and the second application is one of a word-processing application, a presentation application, or a spreadsheet application. In yet another example, the method further includes, based on receiving the indication to initialize the first park pane, querying a content deferral-platform for parked items matching the first application type, wherein results returned from the query include the first set of parked items. In still another example, the first application displays an open file having a category, the first set of parked items are further based on the category. In still yet another example, the first park pane includes a category selection menu, and the method further includes receiving a selection of a category from the category selection menu; and filtering the displayed first parked item representations based on the selected category.

Those skilled in the art will recognize that the methods and systems of the present disclosure may be implemented in many manners and as such are not to be limited by the foregoing aspects and examples. In other words, functional elements being performed by a single or multiple components. In this regard, any number of the features of the different aspects described herein may be combined into single or multiple aspects, and alternate aspects having fewer than or more than all of the features herein described are possible. Functionality may also be, in whole or in part, distributed among multiple components, in manners now known or to become known.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Numerous other changes may be made which will readily suggest themselves to those skilled in the art and which are encompassed in the spirit of the disclosure and as defined in the appended claims. While various aspects have been described for purposes of this disclosure, various changes and modifications may be made which are well within the scope of the disclosure. Numerous other changes may be made which will readily suggest themselves to those skilled in the art and which are encompassed in the spirit of the disclosure and as defined in the claims.

The invention claimed is:

1. A system for deferring content, the system comprising:
a processor; and
memory storing instructions that, when executed by the processor, cause the system to perform operations comprising:
receiving an input from within an application executing on a client device to create a parked item for a content item displayed within the application;
creating a data container, in a content-deferral platform, for the parked item;
requesting, from a remote storage platform, metadata associated with the content item;
storing the metadata associated with the content item in the data container;
causing a display of a representation of the parked item;
receiving, via interactions with the parked item representation, additional data for the parked item; and
storing the additional data in the data container for the parked item at the content-deferral platform.

2. The system of claim 1, wherein the application is one of a messaging application, a communication application, a video application, or a productivity application.

3. The system of claim 2, wherein the operations further comprise:
causing a display of a park pane within the application; and
wherein display of the representation of the parked item is within the park pane of the application.

4. The system of claim 1, wherein the representation of the parked item includes at least three of a content preview, a content type indicator, a title, a recent activity indicator, a category indicator, a note icon, or a launch icon.

5. The system of claim 1, wherein the representation of the parked item includes a note generation icon and the operations further comprise:
receiving a selection of the note generation icon;
based on receiving the selection of the note generation icon, causing a display of a note editing interface element, within the representation of the parked item, for receiving text for a note of the parked item;
receiving text for the note in the note editing interface; and
storing the note as the additional data for the parked item.

6. The system of claim 1, wherein the application is a first application and the operations further comprise:
receiving a launch indication for a park pane within a second application; and
causing a display of the representation of the parked item associated with the first application in the park pane.

7. The system of claim 1, wherein the data container includes defined metadata fields for metadata supported by the content-deferral platform, and storing the metadata associated with the content item includes filling the defined metadata fields with the received metadata.

8. The system of claim 1, wherein the representation of the parked item includes a category indicator indicating a category for the parked item.

9. A computer-implemented method for accessing deferred content, the method comprising:
receiving an indication to initialize a park pane in a productivity application on a client device;
based on receiving the indication to initialize the park pane, retrieving parked items from a content-deferral platform of a remote server, wherein each parked item includes a data container of each parked item including metadata for a content item and additional data for the parked item; and causing a display of the park pane including parked item representations for the retrieved parked items, wherein each of the parked item representations include at least three of a content preview, a content type indicator, a title, a recent activity indicator, a category indicator, a note icon, or a launch icon.

10. The computer-implemented method of claim 9, wherein the additional data includes at least one of a note or a category for the parked item.

11. The computer-implemented method of claim 9, wherein:

the content preview, the content type indicator, and the title are based on the metadata stored in the parked item; and the category indicator and the note icon are based on the additional data stored in the parked item.

12. The computer-implemented method of claim 9, wherein the productivity application is one of a word-processing application, a spreadsheet application, or a presentation application.

13. The computer-implemented method of claim 9, wherein the at least one of the retrieved parked items is for a file stored in a remote storage platform, and retrieving the parked items includes querying the remote storage platforms for updates to metadata of the file.

14. The computer-implemented method of claim 9, wherein the parked items are retrieved based on an application type of the productivity application.

15. The computer-implemented method of claim 9, further comprising:

receiving an interaction with the representation of the parked item; and based on receiving the interaction, adjusting the representation to be an expanded representation of the parked item.

16. A computer-implemented method for accessing deferred content, the method comprising:

receiving an indication to initialize a first park pane within a first application having a first application type;

based on receiving the indication to initialize the first park pane, causing a display of first parked item representations, within the first park pane, for a first set of parked items, wherein the first set of parked items are based on the first application type;

receiving an indication to initialize a second park pane within a second application having a second application type different than the first application type; and based on receiving the indication to initialize the second park pane, causing a display of second parked item representations, within the second park pane, for a second set of parked items, wherein the second set of parked items are based on the second application type.

17. The computer-implemented method of claim 16, wherein the first application is one of a messaging application or a communication application, and the second application is one of a word-processing application, a presentation application, or a spreadsheet application.

18. The computer-implemented method of claim 16, further comprising, based on receiving the indication to initialize the first park pane, querying a content deferral-platform for parked items matching the first application type, wherein results returned from the query include the first set of parked items.

19. The computer-implemented method of claim 16, wherein the first application displays an open file having a category, the first set of parked items are further based on the category.

20. The computer-implemented method of claim 16, wherein the first park pane includes a category selection menu, and the method further comprises:

receiving a selection of a category from the category selection menu; and filtering the displayed first parked item representations based on the selected category.

* * * * *